US012602593B2

(12) United States Patent
Wang et al.

(10) Patent No.: US 12,602,593 B2
(45) Date of Patent: Apr. 14, 2026

(54) USER EQUIPMENT-COORDINATION SET FEDERATED FOR DEEP NEURAL NETWORKS

(71) Applicant: Google LLC, Mountain View, CA (US)

(72) Inventors: Jibing Wang, Mountain View, CA (US); Erik Stauffer, Mountain View, CA (US)

(73) Assignee: Google LLC, Mountain View, CA (US)

( * ) Notice: Subject to any disclaimer, the term of this patent is extended or adjusted under 35 U.S.C. 154(b) by 533 days.

(21) Appl. No.: 18/027,059

(22) PCT Filed: Sep. 14, 2021

(86) PCT No.: PCT/US2021/050335
§ 371 (c)(1),
(2) Date: Mar. 17, 2023

(87) PCT Pub. No.: WO2022/060748
PCT Pub. Date: Mar. 24, 2022

(65) Prior Publication Data
US 2023/0325679 A1 Oct. 12, 2023

Related U.S. Application Data

(60) Provisional application No. 63/080,295, filed on Sep. 18, 2020.

(51) Int. Cl.
*H04L 41/16* (2022.01)
*G06N 3/045* (2023.01)
*G06N 3/098* (2023.01)

(52) U.S. Cl.
CPC ............. *G06N 3/098* (2023.01); *G06N 3/045* (2023.01)

(58) Field of Classification Search
CPC ......... G06N 3/098; G06N 3/045; H04L 41/16
(Continued)

(56) References Cited

U.S. PATENT DOCUMENTS 10,666,342 B1 5/2020 Landis et al.
2019/0370687 A1 12/2019 Pezzillo et al.
(Continued)

FOREIGN PATENT DOCUMENTS

CN 110443375 A 11/2019
CN 111295863 A 4/2022
(Continued)

OTHER PUBLICATIONS

Google Scholar search (Year: 2025).*
(Continued)

*Primary Examiner* — Jude Jean Gilles
(74) *Attorney, Agent, or Firm* — Womble Bond Dickinson (US) LLP

(57) ABSTRACT

This disclosure provides systems, devices, apparatus, and methods, including computer programs encoded on storage media, for User Equipment-Coordination Set (UECS) Federated for Deep Neural Networks. A coordinating user equipment (UE) of the UECS communicates, to a second UE in the UECS and using one or more side links, one or more update conditions that indicate when to generate updated machine learning (ML) configuration information for one or more deep neural networks (DNNs) that are configured to perform some or all of a transmitter or a receiver processing functionality to process communications at the second UE. The coordinating UE receives, from the second UE over the one or more side links, one or more reports, each report including the updated ML configuration information determined by the second UE using a training procedure and input data local to the second UE.

20 Claims, 18 Drawing Sheets

(58) Field of Classification Search
USPC ........................................................ 706/25
See application file for complete search history.

(56) References Cited

U.S. PATENT DOCUMENTS

| 2020/0015203 | A1* | 1/2020 | Zhang | .................... | H04B 7/024 |
| 2021/0298063 | A1* | 9/2021 | Damnjanovic | ....... | H04W 76/14 |
| 2021/0298066 | A1* | 9/2021 | Damnjanovic | ....... | H04W 72/23 |
| 2023/0106985 | A1* | 4/2023 | Hu | ......................... | G06N 3/045 |
| | | | | | 706/25 |

FOREIGN PATENT DOCUMENTS

| WO | 2020139811 | A1 | 7/2020 |
| WO | 2020180218 | A1 | 9/2020 |
| WO | 2021080577 | A1 | 4/2021 |
| WO | 2021108082 | A1 | 6/2021 |

OTHER PUBLICATIONS

Bonawitz et al., "Towards Federated Learning at Scale: System Design," Proceedings of the 2nd SysML Conference, Palo Alto, CA, USA, 2019.
McMahan et al., "Federated Learning: Collaborative Machine Learning without Centralized Training Data," Google AI Blog: Apr. 6, 2017, 4 pages https://ai.googleblog.com/2017/04/federated-learning-collaborative.html.
3GPP TSG-RAN WG3 #110-e, Jun. 2-12, 2020 R3-206873 (R3-206873).
The International Search Report and Written Opinion for International Application No. PCT/US2021/050335 mailed on Jan. 12, 2022.
Bhattacharjee Anirban et al, "Deep-Edge: An Efficient Framework for Deep Learning Model Update on Heterogeneous Edge", 2020 IEEE 4th International Conference on Fog and Edge Computing (ICFEC), IEEE, May 11, 2020 (May 11, 2020), p. 75-84.
Lu Yunlong et al, "Differentially Private Asynchronous Federated Learning for Mobile Edge Computing in Urban Informatics", Sep. 17, 2019 (Sep. 17, 2019), vol. 16, No. 3, p. 2134-2143, XP011768092.
Khan Latif U et al, "Self Organizing Federated Learning Over Wireless Networks: A Socially Aware Clustering Approach", 2020 International Conference on Information Networking (ICOIN), IEEE,Jan. 7, 2020 (Jan. 7, 2020), p. 453-458, XP033730206.
Niknam Solmaz et al, "Federated Learning for Wireless Communications: Motivation, Opportunities, and Challenges", Jun. 1, 2020 (Jun. 1, 2020), vol. 58, No. 6, p. 46-51, XP011798620.
Nguyen et al., "Toward Multiple Federated Learning Services Resource Sharing in Mobile Edge Networks," IEEE Transactions on Mobile Computing, Jan. 2023, vol. 22, No. 1, IEEE.
India Patent Appln. No. 202347025223, Examination Report dated Sep. 22, 2025.

* cited by examiner

Figure 3:
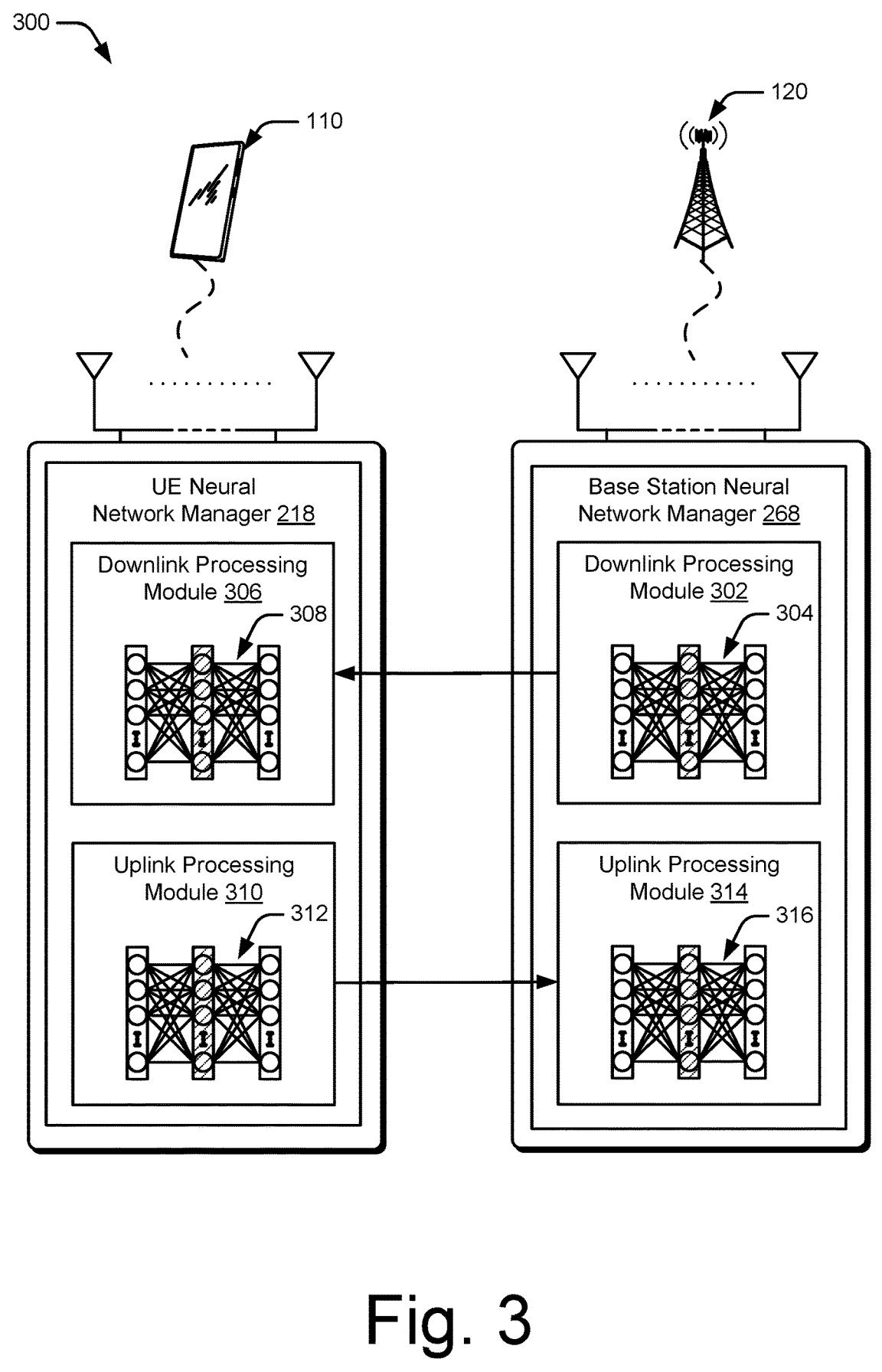

300 ⟍

110

120

UE Neural
Network Manager 218

Downlink Processing
Module 306

308

Uplink Processing
Module 310

312

Base Station Neural
Network Manager 268

Downlink Processing
Module 302

304

Uplink Processing
Module 314

Base Station
120

Coordinating
UE
111

UE
112

UE
113

Determine
common UECS
ML
configuration(s)
705

Communicate
common UECS ML
configuration(s)
───── 725 ─────

Determine
updated
common UECS
ML
configuration(s)
805

Communicate updated
common UECS ML
configuration
───── 810 ─────▶

Direct UE(s) to use updated common
UECS ML configuration
815 {

Update
DNN(s)
715

Update
DNN(s)
720

900

1100 ⟋

1500 —

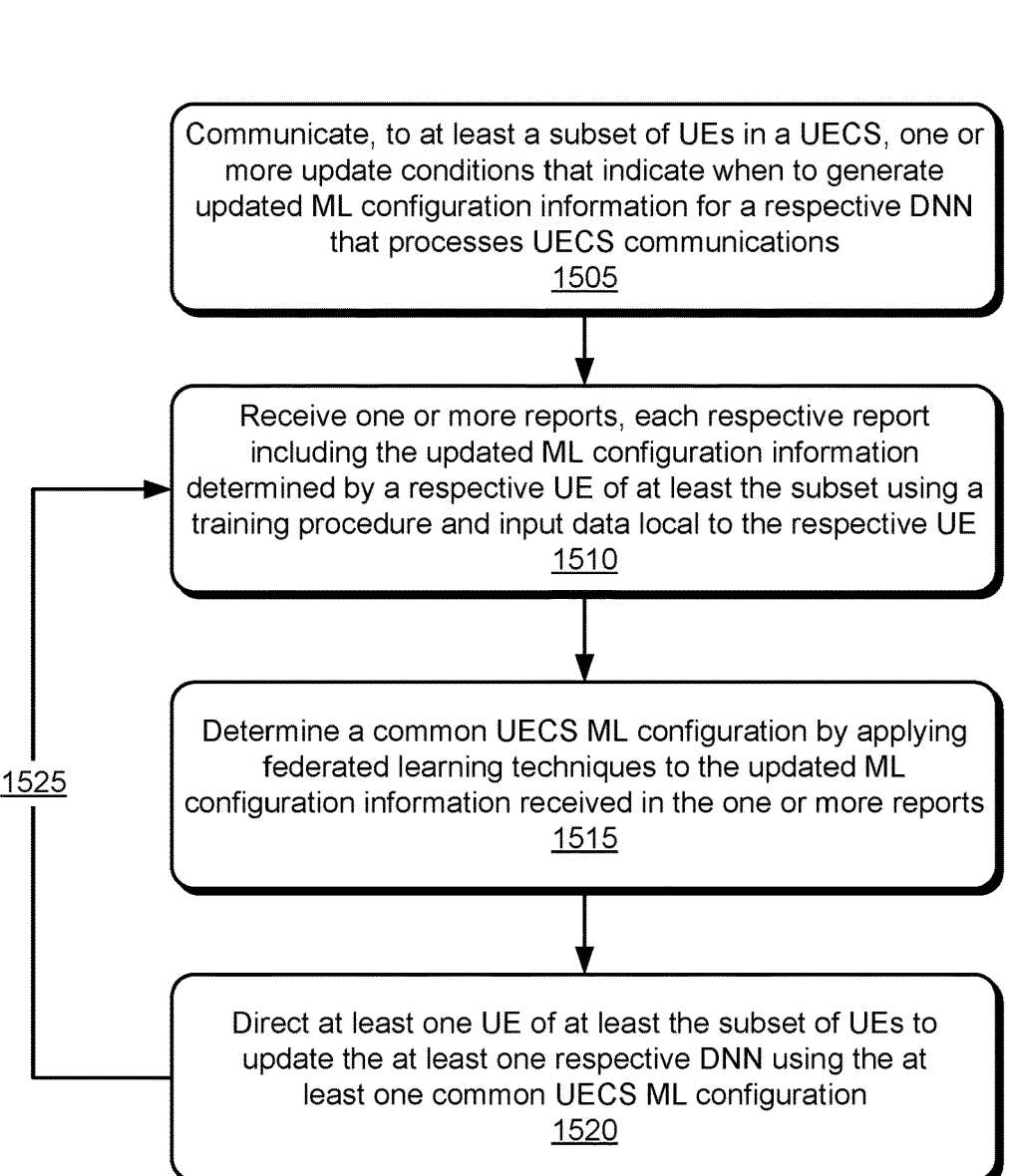

Communicate, to at least a subset of UEs in a UECS, one or more update conditions that indicate when to generate updated ML configuration information for a respective DNN that processes UECS communications
1505

Receive one or more reports, each respective report including the updated ML configuration information determined by a respective UE of at least the subset using a training procedure and input data local to the respective UE
1510

Determine a common UECS ML configuration by applying federated learning techniques to the updated ML configuration information received in the one or more reports
1515

1525

Direct at least one UE of at least the subset of UEs to update the at least one respective DNN using the at least one common UECS ML configuration
1520

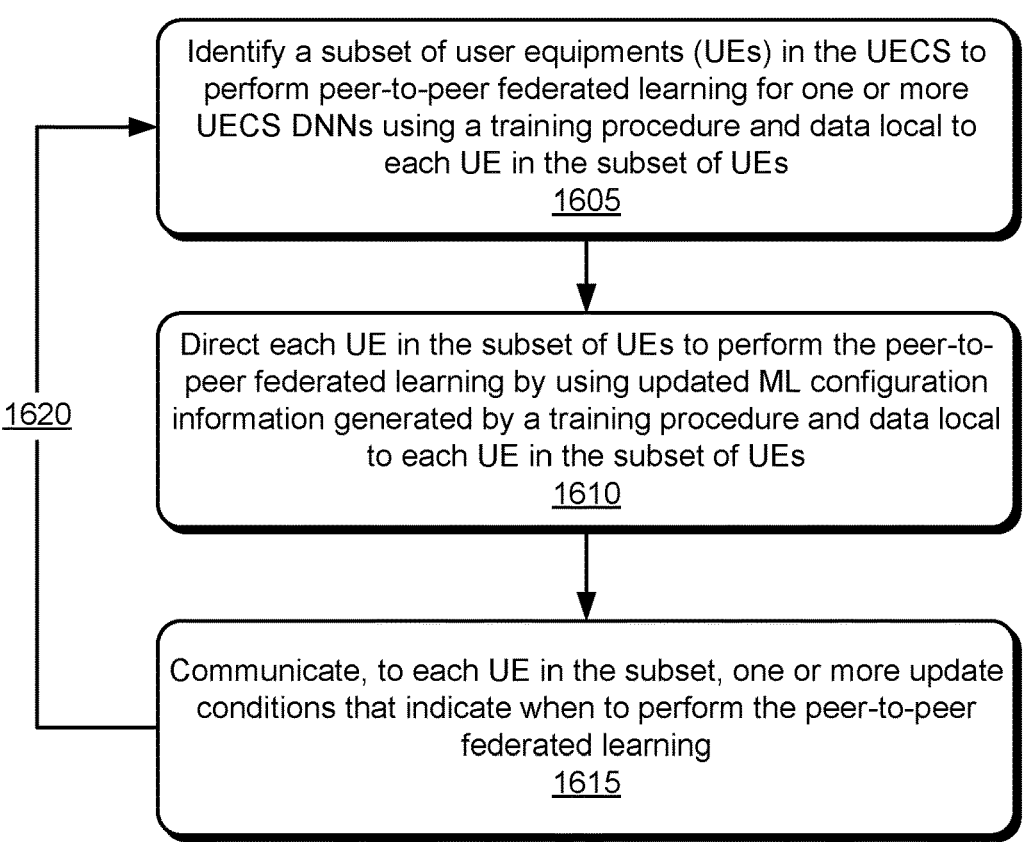

Identify a subset of user equipments (UEs) in the UECS to perform peer-to-peer federated learning for one or more UECS DNNs using a training procedure and data local to each UE in the subset of UEs
1605

Direct each UE in the subset of UEs to perform the peer-to-peer federated learning by using updated ML configuration information generated by a training procedure and data local to each UE in the subset of UEs
1610

Communicate, to each UE in the subset, one or more update conditions that indicate when to perform the peer-to-peer federated learning
1615

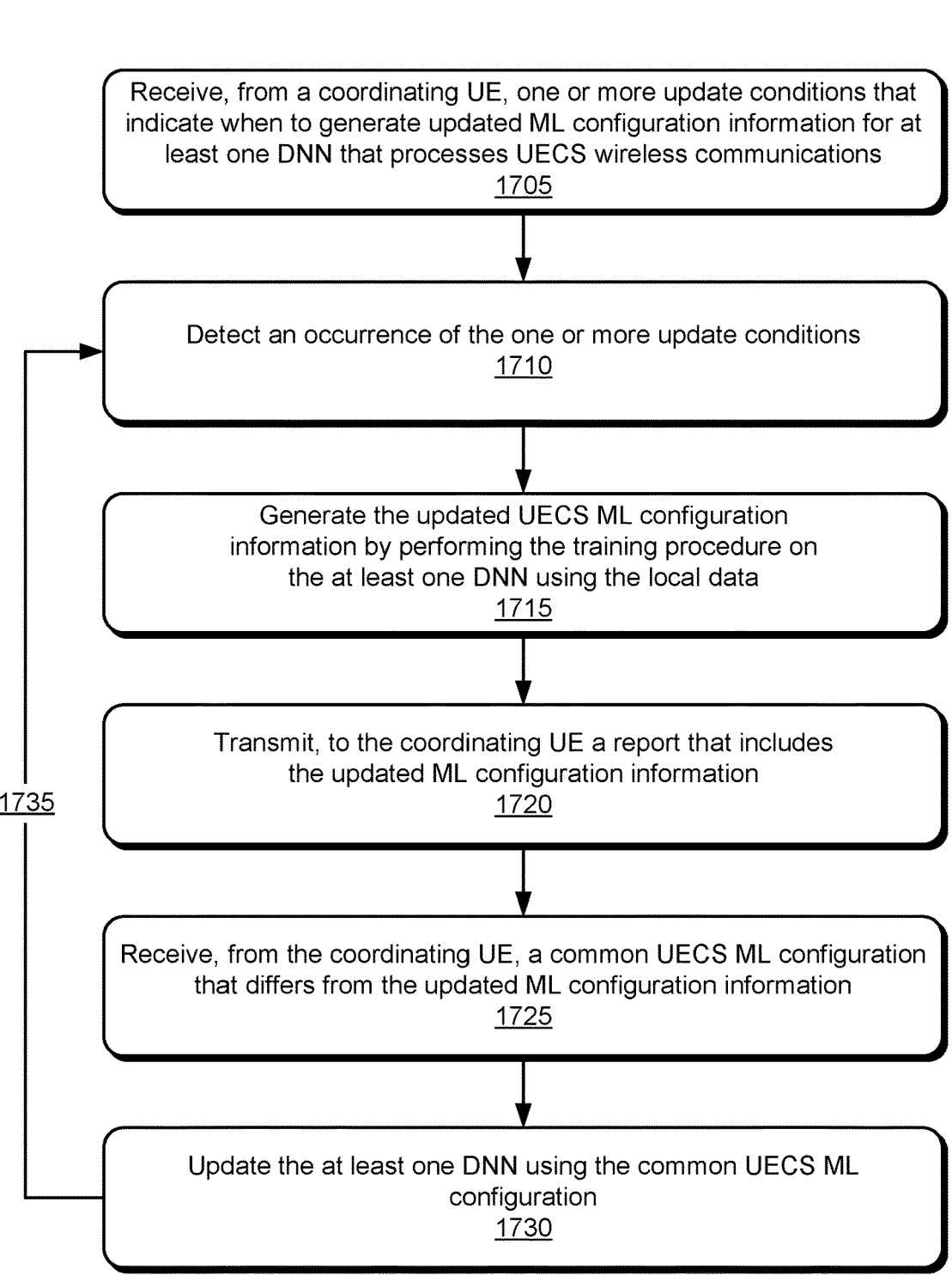

Receive, from a coordinating UE, one or more update conditions that indicate when to generate updated ML configuration information for at least one DNN that processes UECS wireless communications
1705

Detect an occurrence of the one or more update conditions
1710

Generate the updated UECS ML configuration information by performing the training procedure on the at least one DNN using the local data
1715

Transmit, to the coordinating UE a report that includes the updated ML configuration information
1720

1735

Receive, from the coordinating UE, a common UECS ML configuration that differs from the updated ML configuration information
1725

Update the at least one DNN using the common UECS ML configuration
1730

Fig. 17

1800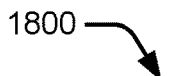

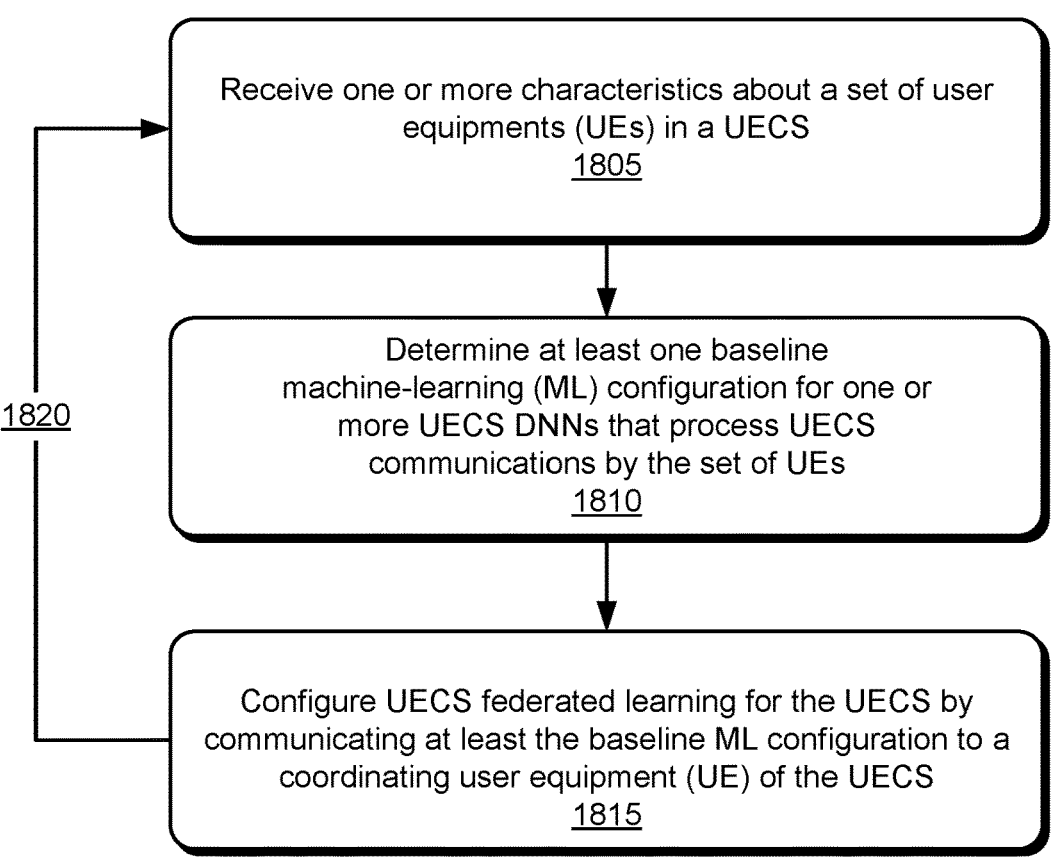

Receive one or more characteristics about a set of user equipments (UEs) in a UECS
1805

Determine at least one baseline machine-learning (ML) configuration for one or more UECS DNNs that process UECS communications by the set of UEs
1810

Configure UECS federated learning for the UECS by communicating at least the baseline ML configuration to a coordinating user equipment (UE) of the UECS
1815

USER EQUIPMENT-COORDINATION SET FEDERATED FOR DEEP NEURAL NETWORKS

CROSS-REFERENCE TO RELATED APPLICATIONS

This application is a U.S. National Phase Under 35 U.S.C. § 371 of International Application No. PCT/US2021/050335, filed Sep. 14, 2021, which claims priority under applicable law of U.S. Provisional Patent Application No. 63/080,295 filed Sep. 18, 2020, the entire contents of which are hereby incorporated by reference.

BACKGROUND

In a wireless network, a base station provides a user equipment (UE) with connectivity to various services, such as data and/or voice services, over a cell coverage area. The base station typically determines configurations for a wireless connection used by the UE to access the services. For example, the base station determines bandwidth and timing configurations of the wireless connection.

The quality of the wireless connection between the base station and the UE often varies based on a number of factors, such as signal strength, bandwidth limitations, interfering signals, and so forth. A first UE operating at an edge of a cell coverage area, for example, typically receives a weaker signal from the base station relative to a second UE operating relatively close to the center of the cell coverage area. Thus, as the UE moves to different regions of the cell coverage area, the quality of service sometimes degrades. With recent advancements in wireless communication systems, such as Fifth Generation New Radio (5G NR), new approaches may be available to improve the quality of service.

SUMMARY

This document describes techniques and apparatuses for user equipment-coordination set (UECS) federated learning for deep neural networks (DNNs). In aspects, a coordinating user equipment (UE) in a UECS communicates, to at least a subset of UEs in the UECS, one or more update conditions that indicate when to generate updated machine-learning (ML) information for a DNN that processes UECS communications. In aspects, the coordinating UE receives one or more reports that include the updated ML configuration information from respective UEs in the subset of UEs. In aspects, the respective UE generates the updated ML configuration information using a training procedure and local input data. The coordinating UE determines a common UECS ML configuration by applying federated learning techniques to the updated ML configuration information from each UE in the subset of UEs and directs at least one UE of the subset of UEs to update the respective DNN using the common UECS ML configuration.

In some aspects, a coordinating UE identifies a subset of UEs in the UECS to perform peer-to-peer federated learning for one or more UECS DNNs using a training procedure and data local to each UE in the subset of UEs. The coordinating UE then directs each UE in the subset of UEs to perform the peer-to-peer federated learning using a training procedure and data local to each UE in the subset of UEs. Alternatively, or additionally, the coordinating UE communicates, to each UE in the subset, one or more update conditions that indicate when to perform the peer-to-peer federated learning.

In some aspects, a UE in a user equipment-coordination set (UECS) provides updated ML configuration information for federated learning. The UE receives, from a coordinating UE in the UECS and over a side link, one or more update conditions that indicate when to generate the updated UECS ML configuration information, using a training procedure and local data, for at least one deep neural network (DNN) that processes UECS wireless communications. The UE detects an occurrence of the one or more update conditions and generates the updated ML configuration information by performing the training procedure on the at least one DNN using the local data. In aspects, the UE transmits, to the coordinating UE and using the side link, a report that includes the updated ML configuration information and receives, from the coordinating UE, a common UECS ML configuration based on at least one other UE in the UECS, where the common UECS ML configuration differs from the updated UECS ML configuration information. The UE then updates the at least one DNN using the common UECS ML configuration.

In aspects, a base station participates in federated learning of one or more DNNs used in a UECS. The base station receives one or more characteristics about a set of UEs in the UECS and determines at least one baseline ML configuration for one or more UECS DNNs used by the set of UEs. The base station then configures UECS federated learning for the UECS by communicating at least the baseline ML configuration to a coordinating UE of the UECS.

The details of one or more implementations of UECS federated learning for DNNs are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of user equipment-coordination set (UECS) federated learning for deep neural networks (DNNs) are described below. The use of the same reference numbers in different instances in the description and the figures indicate similar elements:

FIG. 3 illustrates an example operating environment in which multiple deep neural networks are utilized in a wireless communication system in accordance with various aspects of UECS federated learning for DNNs;

FIG. 15 illustrates an example method in accordance with various aspects of UECS federated learning for DNNs;

FIG. 16 illustrates an example method in accordance with various aspects of UECS federated learning for DNNs;

FIG. 17 illustrates an example method in accordance with various aspects of UECS federated learning for DNNs; and FIG. 18 illustrates an example method in accordance with various aspects of UECS federated learning for DNNs.

DETAILED DESCRIPTION

Figure 1:
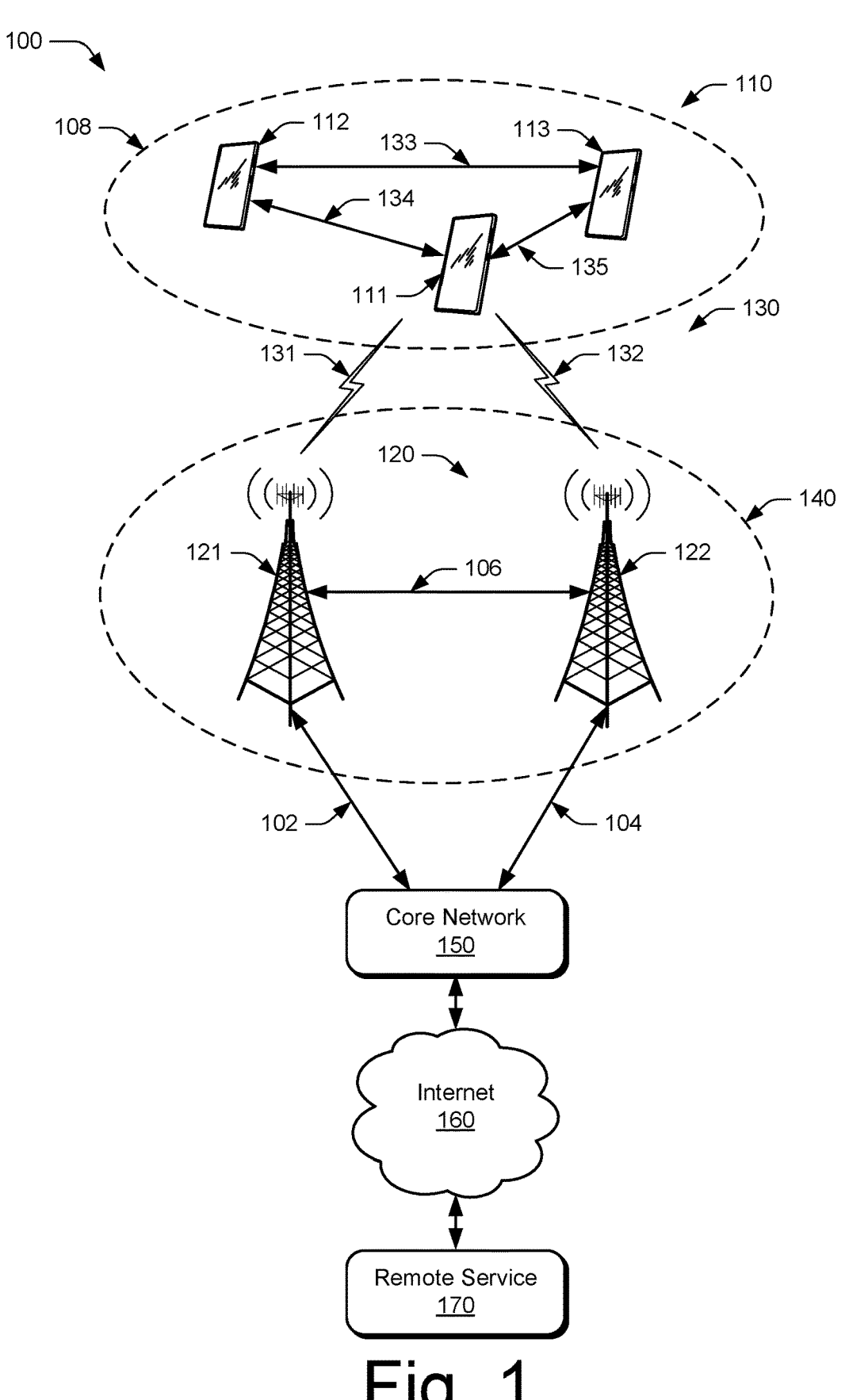
FIG. 1 illustrates an example environment in which various aspects of UECS federated learning for DNNs can be implemented.

In wireless communication systems, various factors affect a quality of service provided by a base station to a user equipment (UE), such as a location of the UE affecting signal strength. To improve the quality of service, various aspects configure and/or establish a user equipment-coordination set (UECS) to perform joint processing (e.g., joint transmission, joint reception) of communications for a target UE.

Generally, a UECS includes at least two UEs that communicate through a side link (e.g., a wireless direct communication between two devices without going through a base station) to share or distribute signal-related information for downlink and/or uplink UECS communications to a base station or other wireless network element. By having multiple UEs form a UECS for joint transmission and/or reception of network data for a target UE within the UECS, the UEs in the UECS coordinate in a manner similar to a distributed antenna to improve the effective signal quality between the target UE and the base station. Downlink data intended for the target UE can be transmitted to the multiple UEs in the UECS. Each of the UEs demodulates and samples the downlink data and then uses a local wireless connection to forward the samples to a single UE in the UECS, such as a coordinating UE or the target UE, for joint processing. In addition, uplink data generated by the target UE can be distributed using the local wireless connection to the multiple UEs in the UECS for joint transmission to the base station. Coordinating joint transmission and reception of data intended for the target UE significantly increases the target UE's effective transmission power and/or received power, thus improving the effective signal quality.

Deep neural networks (DNNs) provide solutions for performing various types of operations. To illustrate, UEs within a UECS can include DNNs that process UECS communications, such as downlink UECS communications over a wireless cellular network from a base station to a UE participating in the UECS, uplink UECS communications over the wireless cellular network from the UE to the base station, side-link UECS communications from the UE to a coordinating UE, side-link UECS communications from the coordinating UE to the UE, side-link UECS communications from the coordinating UE to a target UE in the UECS, side-link UECS communications from the target UE to the coordinating UE, and/or side-link peer-to-peer communications between a first UE participating in the UECS and a second UE participating in the UECS (where the first and second UEs are not the coordinating UE). Some aspects of UECS federated learning train one or more DNN(s) in jointly processing (e.g., joint reception, joint transmission) UECS communications between one or more base stations and multiple UEs included in a UECS. As one example, the DNN(s) learn to: (a) process communications transferred over a first wireless network between a base station and the UEs included in the UECS, and/or (b) process communications transferred over a second, local wireless connection and/or side link between the UEs included in the UECS.

Generally, machine-learning (ML) algorithms, such as DNNs, learn how to process input data and transform the input data to generate an output. The ML algorithms receive processing feedback that indicates the accuracy, or inaccuracy, of the generated output and modify various architecture and parameter configurations of the ML algorithm to improve the accuracy and quality of the generated output. In some aspects, an ML controller or manager generates different ML configurations for the ML algorithm based on different operating conditions. To illustrate, the ML controller generates different ML configurations for a DNN that processes wireless communications based on variations in signal or link quality parameters, UE capabilities, timing information, modulation coding schemes (MCS), and so forth. This enables the ML controller to dynamically modify the DNN based on current operating conditions and improve an overall performance (e.g., higher processing resolution, faster processing, lower bit errors, improved signal quality, reduced latency) of the wireless communications transmitted through the wireless network.

Federated learning corresponds to a distributed training mechanism for a machine-learning algorithm. To illustrate, an ML controller selects a baseline ML configuration and directs multiple devices to form and train an ML algorithm using the baseline ML configuration as a starting point. The ML controller then receives and aggregates and/or combines training results from the multiple devices to generate an updated common UECS ML configuration for the ML algorithm. As one example of aggregating and/or combining the results, the multiple devices each report learned parameters (e.g., weights or coefficients) generated by the ML algorithm while processing local and/or private input data, and the ML controller determines an updated common UECS ML configuration by averaging the weights or coefficients to create an updated common UECS ML configuration. As another example, the multiple devices each report gradient results, based on their own individual input data, to the ML controller, and the ML controller determines the common ML configuration based on a cost function and/or loss function. As another example, the ML controller determines the optimal ML configuration by averaging the gradients. However, the ML controller can combine the training results (e.g., ML parameters, ML architectures) received from multiple devices to determine the common ML configuration using any suitable function, such as by applying weighted mean functions, minimizing and/or maximizing functions, least-squares functions, adding regularization terms, and so forth, to the input data. In some aspects, the multiple devices report learned ML architecture updates and/or changes from the baseline ML configuration.

By reporting learned weights/coefficients, gradients, or ML architectures of the ML algorithm, rather than their particular input data, the devices communicate learned results without exposing the input data. This protects the privacy of each device and provides adaptive ML information (e.g., weights, coefficients, biases, number of layers, layer down-sampling configurations, adding or removing fully convolutional layers) to the ML controller. The ML controller then applies federated learning techniques to generate a resultant ML configuration. In other words, the multiple devices collaborate by sharing respective adaptive ML information with the ML controller. Using federated learning techniques, the ML controller generates a common UECS ML configuration that can be used by the multiple devices. This collaboration helps improve the resultant ML configuration (e.g., the common UECS ML configuration) and the resultant DNN updated and/or formed using the resultant ML configuration. To illustrate, with reference to DNNs that process wireless communications (e.g., UECS DNNs), the resultant DNN improves the overall performance of processing the wireless communications transmitted in a wireless network.

To improve network reliability and efficiency of network resource utilization, and improve the overall performance of UECS DNNs processing UECS communications, aspects of UECS federated learning for DNNs generate ML configurations by having a coordinating UE in a UECS perform federating learning using at least a subset of (or all) UEs in the UECS. To illustrate, assume that individual UEs participating in the UECS form DNNs using a baseline ML configuration, where the DNNs process UECS communications. In response to detecting a trigger event, such as a UE location change, a change in an ML parameter, or a change in an ML architecture, the individual UEs perform a training procedure that generates updated UECS ML configuration information. The updated ML configuration information can include any combination of updated ML parameters and/or ML architecture. A coordinating UE of the UECS receives and aggregates and/or combines the updated ML configuration information from the individual UEs in the UECS and determines a common UECS ML configuration that improves how the DNNs process the wireless communications relative to the baseline ML configuration based on current operating conditions (e.g., location, UE capabilities, signal and/or link quality). The coordinating UE then directs the UEs participating in the UECS to update one or more DNNs using the (improved) common UECS ML configuration. In some aspects, the coordinating UE communicates the common UECS ML configuration to the base station, which may generate an updated common UECS ML configuration by applying federated learning techniques at the base station. Using federated learning techniques at a coordinating UE to generate a common UECS ML configuration not only generates a common UECS ML configuration directed to improving how the UECS DNNs process the UECS communications, but also reduces an amount of traffic exchanged with the base station because the coordinating UE exchanges the communications with the UEs rather than the base station. This also frees the base station to process other network communications. The reduced base station traffic improves the overall network reliability and efficiency of the network because the base station redirects the network resources that would have been used by the base station for federated learning of UECS DNNs to other devices and other communications.

Example Environment

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121 and 122) through one or more wireless communication links 130 (wireless link 130), illustrated at wireless link 131 and wireless link 132. Each UE 110 in a UECS 108 (illustrated as UE 111, UE 112, and UE 113) can communicate with a coordinating UE of the UECS and/or a target UE in the UECS through a side link, such as one or more local wireless connections (e.g., WLAN, Bluetooth, NFC, a personal area network (PAN), WiFi-Direct, IEEE 802.15.4, ZigBee, Thread, millimeter-wavelength communication (mmWave), or the like) illustrated as wireless connections 133, 134, and 135. Alternatively, or additionally, each UE 110 can communicate using air interface resources allocated by the base station 120 for side link communications (e.g., air interface resources allocated for intra-UECS communications directly between UEs participating in the UECS). Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station, or the like, or any combination thereof.

The base stations 120 communicate with the UE 110 using one or more wireless links 131, 132, which may be implemented as any suitable type of wireless link. A wireless link 131, 132 includes control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) communication with the UE 110.

The base stations 120 collectively form a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane information and using an NG3 interface for user-plane data communications when connecting to a 5G core network, or using an S1 interface for control-plane information and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at interface 106, to exchange user-plane data and control-plane information. The user equipment 110 may connect, via the core network 150, to public networks, such as the Internet 160, to interact with a remote service 170.

The base station 121 can specify a set of UEs (e.g., the UE 111, UE 112, and UE 113) to form a UECS (e.g., the UECS 108) for joint transmission and joint reception of signals for a target UE (e.g., the UE 112). The base station 121 may select UE 111 to act as the coordinating UE since the UE 111 is located between UE 112 and UE 113 or because the UE 111 is capable of communicating with each of the other UEs 112 and 113 in the UECS. The base station 121 selects UE 111 to coordinate messages and in-phase and quadrature (I/Q) samples sent between the base station 121 and the UEs 111, 112, 113 for the target UE 112. Communication among the UEs can occur using a local wireless connection, such as a PAN, NFC, Bluetooth, WiFi-Direct, local mmWave link, and so on. In this example, all three of the UEs 111, 112, 113 receive radio frequency (RF) signals from the base station 121. The UE 111, UE 112, and UE 113 demodulate the RF signals to produce baseband I/Q analog signals and sample the baseband I/Q analog signals to produce I/Q samples. The UE 112 and the UE 113 forward the I/Q samples along with system timing information (e.g., system frame number (SFN)) using the local wireless connection to the coordinating UE 111 using its own local wireless connection transceiver. The coordinating UE 111 then uses the timing information to synchronize and combine the I/Q samples and processes the combined signal to decode data packets for the target UE 112. The coordinating UE 111 then transmits the data packets to the target UE 112 using the local wireless connection.

When the target UE 112 has uplink data to send to the base station 121, the target UE transmits the uplink data to the coordinating UE 111 that uses the local wireless connection to distribute the uplink data, as I/Q samples, to each UE in the UECS 108. Each UE in the UECS 108 synchronizes with the base station 121 for timing information and its data transmission resource assignment. Then, all three UEs in the UECS 108 jointly transmit the uplink data to the base station 121. The base station 121 receives the transmitted uplink data from the UEs 111, 112, 113 and jointly processes the combined signal to decode the uplink data from the target UE 112.

Example Devices

Figure 2:
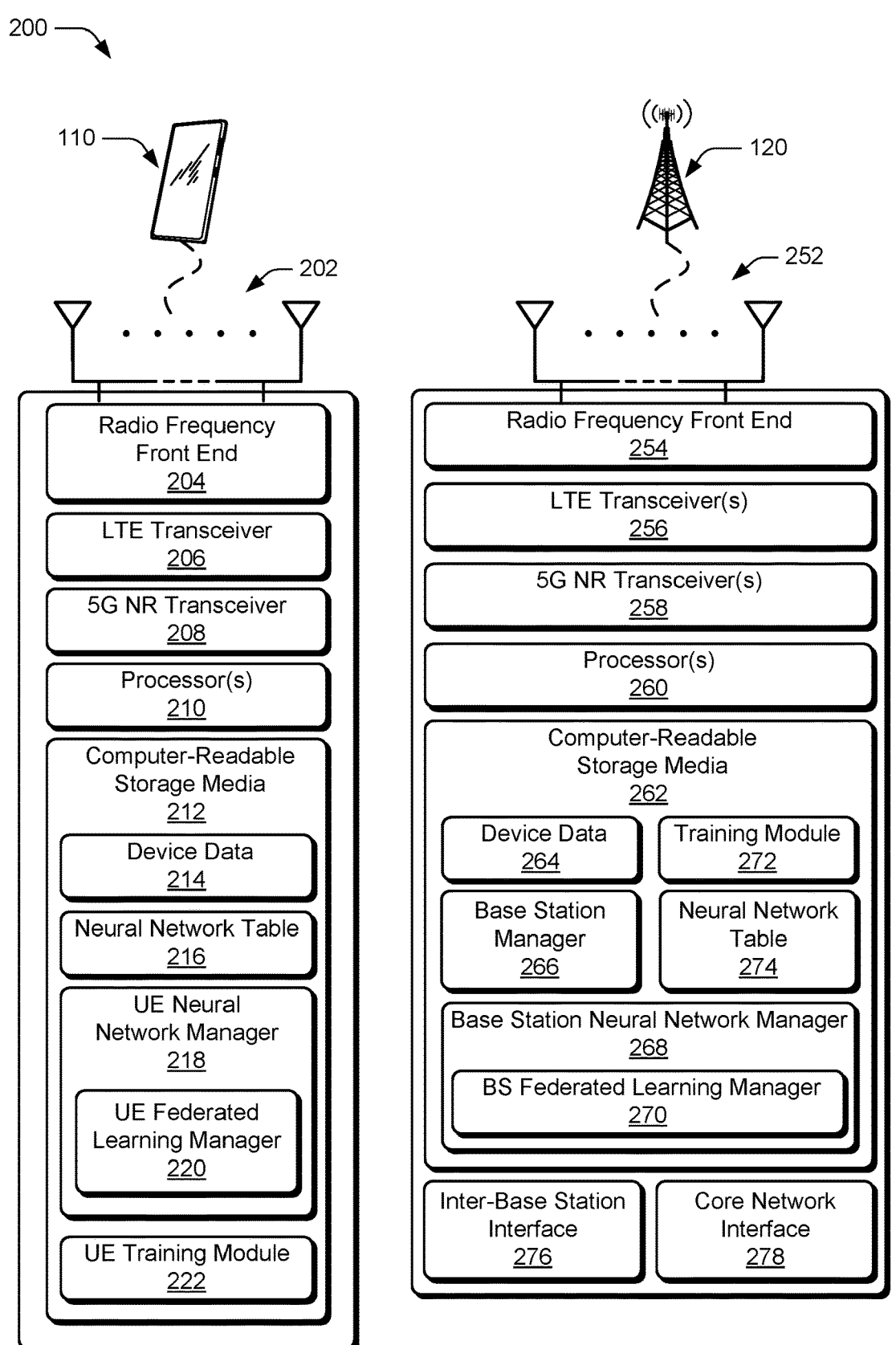
FIG. 2 illustrates an example device diagram of devices that can implement various aspects of UECS federated learning for DNNs.

FIG. 2 illustrates an example device diagram 200 of the UE 110 and one of the base stations 120 that can implement various aspects of UECS federated learning for DNNs in a wireless communication system. The UE 110 and/or the base station 120 may include additional functions and interfaces that are omitted from FIG. 2 for the sake of clarity.

The UE 110 includes antennas 202, a radio frequency front end 204 (RF front end 204), and a wireless transceiver (e.g., an LTE transceiver 206, and/or a 5G NR transceiver 208) for communicating with the base station 120 in the RAN 140. The RF front end 204 of the UE 110 can couple or connect the LTE transceiver 206, and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor 210 may be a single-core processor or a multiple-core processor composed of a variety of materials, such as silicon, poly-silicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beam-forming codebooks, applications, neural network (NN) tables, neural network training data, and/or an operating system of the UE 110, some of which are executable by processor(s) 210 to enable user-plane data, control-plane information, and user interaction with the UE 110.

In aspects, the CRM 212 includes a neural network table 216 that stores various architecture and/or parameter configurations that form a neural network, such as, by way of example and not of limitation, parameters that specify a fully connected layer neural network architecture, a convolutional layer neural network architecture, a recurrent neural network layer, a number of connected hidden neural network layers, an input layer architecture, an output layer architecture, a number of nodes utilized by the neural network, coefficients (e.g., weights and biases) utilized by the neural network, kernel parameters, a number of filters utilized by the neural network, strides/pooling configurations utilized by the neural network, an activation function of each neural network layer, interconnections between neural network layers, neural network layers to skip, and so forth. Accordingly, the neural network table 216 includes any combination of neural network formation configuration elements (NN formation configuration elements), such as architecture and/or parameter configurations that can be used to create a neural network formation configuration (NN formation configuration) that includes a combination of one or more NN formation configuration elements that define and/or form a DNN. In some aspects, a single index value of the neural network table 216 maps to a single NN formation configuration element (e.g., a 1:1 correspondence). Alternatively, or additionally, a single index value of the neural network table 216 maps to an NN formation configuration (e.g., a combination of NN formation configuration elements). In some implementations, the neural network table includes input characteristics for each NN formation configuration element and/or NN formation configuration, where the input characteristics describe properties about the training data used to generate the NN formation configuration element and/or NN formation configuration as further described.

The CRM 212 may also include a user equipment neural network manager 218 (UE neural network manager 218). Alternatively, or additionally, the UE neural network manager 218 may be implemented in whole or part as hardware logic or circuitry integrated with or separate from other components of the UE 110. The UE neural network manager 218 accesses the neural network table 216, such as by way of an index value, and forms a DNN using the NN formation configuration elements specified by an NN formation configuration. This includes updating the DNN with any combination of architectural changes and/or parameter changes to the DNN as further described, such as a small change to the DNN that involves updating parameters and/or a large change that reconfigures node and/or layer connections of the DNN. In implementations, the UE neural network manager forms multiple DNNs to process wireless communications (e.g., downlink communications, uplink communications).

The UE neural network manager 218 includes a UE federated learning manager 220 that manages operations associated with providing updated ML configuration information (e.g., learned ML parameters, learned ML architectures) about a neural network (e.g., a DNN) formed at the UE 110 to a federated learning manager that aggregates and/or combines updated ML configuration information from multiple devices. Alternatively, or additionally, the UE federated learning manager 220 applies federated learning techniques to determine a common UECS ML configuration, such as by aggregating and/or combining the updated ML configuration information from multiple UEs. This can include determining a common UECS ML configuration that indicates a (delta) update to an initial and/or baseline ML configuration used by one or more UEs or a common UECS ML configuration that indicates an (absolute) ML configuration that forms new DNN. In some aspects, the UE federated learning manager 220 selects a subset of UEs to include in the federated learning based on common characteristics (e.g., estimated UE location, UE capabilities) or common channel conditions (e.g., indicated by signal or link quality parameters). In aspects, the subset of UEs includes at least two UEs.

While FIG. 2 shows the UE neural network manager 218 as including the UE federated learning manager 220, other aspects implement the UE neural network manager 218 separately from the UE federated learning manager 220. The UE federated learning manager 220 identifies requests from the base station 120 that indicate one or more conditions that specify when to train a DNN and/or when to report the updated ML configuration information to the base station 120. To illustrate, the base station 120 indicates, to the UE federated learning manager 220, to perform a training procedure and/or to transmit updated ML configuration information in response to identifying a trigger event (e.g., changing ML parameters, changing ML architectures, changing signal or link quality parameters, changing UE location). As another example, the base station 120 or a coordinating UE in the UECS 108 indicates, to the UE federated learning manager 220, a schedule on when to perform the training procedure and/or to transmit updated UECS ML configuration information, such as a periodic schedule. The UE federated learning manager 220 identifies the request and conditions received from the base station 120 and/or the coordinating UE and monitors for an occurrence of the condition(s). In some aspects, the UE federated learning manager 220 communicates with a UE training module 222 to trigger a training procedure and/or to extract updated UECS ML configuration information.

The CRM 212 includes the UE training module 222 that communicates with the UE federated learning manager 220. Alternatively, or additionally, the UE training module 222 may be implemented in whole or part as hardware logic or circuitry integrated with or separate from other components of the UE 110. In response to receiving an indication from the UE federated learning manager 220, the UE training module 222 supplies a DNN with known input data, such as input data stored as the device data 214. The UE training module 222 teaches and trains DNNs using known input data and/or by providing feedback to the ML algorithm. This includes training the DNN(s) offline (e.g., while the DNN is not actively engaged in processing the communications) and/or online (e.g., while the DNN is actively engaged in processing the communications).

In implementations, the UE training module 222 extracts updated ML configuration information from a DNN and forwards the updated ML configuration information to the UE federated learning manager 220. The extracted updated ML configuration information can include any combination of information that defines the behavior of a neural network, such as node connections, coefficients, active layers, weights, biases, pooling, etc.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio frequency front end 254 (RF front end 254), one or more wireless transceivers (e.g., one or more LTE transceivers 256, and/or one or more 5G NR transceivers 258) for communicating with the UE 110. The RF front end 254 of the base station 120 can couple or connect the LTE transceivers 256 and the 5GNR transceivers 258 to the antennas 252 to facilitate various types of wireless communication. The antennas 252 of the base station 120 may include an array of multiple antennas that are configured similar to, or different from, each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive multiple-input, multiple-output (Massive-MIMO), for the transmission and reception of communications with the UE 110.

The base station 120 also includes processor(s) 260 and computer-readable storage media 262 (CRM 262). The processor 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by processor(s) 260 to enable communication with the UE 110.

CRM 262 also includes a base station manager 266. Alternatively, or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with a core network, such as the core network 150.

CRM 262 also includes a base station neural network manager 268 (BS neural network manager 268). Alternatively, or additionally, the BS neural network manager 268 may be implemented in whole or part as hardware logic or circuitry integrated with or separate from other components of the base station 120. In at least some aspects, the BS neural network manager 268 selects the NN formation configurations utilized by the base station 120 and/or UE 110 to configure deep neural networks for processing wireless communications, such as by selecting a combination of NN formation configuration elements to form a DNN for processing wireless network communications (e.g., UECS communications). In some implementations, the BS neural network manager 268 receives feedback from the UE 110 and selects the NN formation configuration based on the feedback. Alternatively, or additionally, the BS neural network manager 268 receives neural network formation configuration directions from core network 150 through a core network interface 278 or an inter-base station interface 276 and forwards the NN formation configuration directions to UE 110.

The BS neural network manager 268 includes a base station federated learning manager 270 (BS federated learning manager 270) that manages federated learning of ML algorithms, such as one or more DNNs. The BS federated learning manager 270 indicates, to the UE 110, one or more update conditions (e.g., a trigger event, a schedule) that specify when to perform a training procedure and/or when to report updated ML configuration information to the BS federated learning manager 270. In some aspects, the BS federated learning manager 270 also receives updated ML configuration information from a set of UEs and aggregates and/or combines the updated ML configuration information to determine a common UECS ML configuration usable by a subset of UEs to form DNNs that process wireless communications. This can include determining a common UECS ML configuration that indicates a (delta) update to an initial ML configuration used by the subset of UEs, or a common UECS ML configuration that indicates an (absolute) ML configuration that forms new DNN. In some aspects, the BS federated learning manager 270 selects the subset of UEs based on common characteristics (e.g., estimated UE location, UE capabilities) or common channel conditions (e.g., indicated by signal or link quality parameters). In aspects, the subset of UEs includes at least two UEs. Alternatively, or additionally, the BS federated learning manager 270 selects an initial ML configuration used by multiple devices for federated learning.

The CRM 262 includes a training module 272 and a neural network table 274. In implementations, the base station 120 manages and deploys NN formation configurations to UE 110. Alternatively, or additionally, the base station 120 maintains the neural network table 274. The training module 272 teaches and/or trains DNNs using known input data. For instance, the training module 272 trains DNN(s) for different purposes, such as processing communications transmitted over a wireless communication system (e.g., encoding downlink communications, modulating downlink communications, demodulating downlink communications, decoding downlink communications, encoding uplink communications, modulating uplink communications, demodulating uplink communications, decoding uplink communications). This includes training the DNN(s) offline (e.g., while the DNN is not actively engaged in processing the communications) and/or online (e.g., while the DNN is actively engaged in processing the communications).

In implementations, the training module 272 extracts learned parameter configurations from the DNN to identify the NN formation configuration elements and/or NN formation configuration, and then adds and/or updates the NN formation configuration elements and/or NN formation configuration in the neural network table 274. The extracted parameter configurations include any combination of information that defines the behavior of a neural network, such as node connections, coefficients, active layers, weights, biases, pooling, etc.

The neural network table 274 stores multiple different NN formation configuration elements and/or NN formation configurations generated using the training module 272. In some implementations, the neural network table includes input characteristics for each NN formation configuration element and/or NN formation configuration, where the input characteristics describe properties about the training data used to generate the NN formation configuration element and/or NN formation configuration. For instance, the input characteristics include, by way of example and not of limitation, power information, signal-to-interference-plus-noise ratio (SINR) information, channel quality indicator (CQI) information, reference signal receive quality (RSRQ), channel state information (CSI), Doppler feedback, frequency bands, BLock Error Rate (BLER), Quality of Service (QoS), Hybrid Automatic Repeat reQuest (HARQ) information (e.g., first transmission error rate, second transmission error rate, maximum retransmissions), latency, Radio Link Control (RLC), Automatic Repeat reQuest (ARQ) metrics, received signal strength (RSS), uplink SINR, timing measurements, error metrics, UE capabilities, BS capabilities, power mode, Internet Protocol (IP) layer throughput, end2end latency, end2end packet loss ratio, etc. Accordingly, the input characteristics include, at times, Layer 1, Layer 2, and/or Layer 3 metrics. In some implementations, a single index value of the neural network table 274 maps to a single NN formation configuration element (e.g., a 1:1 correspondence). Alternatively, or additionally, a single index value of the neural network table 274 maps to an NN formation configuration (e.g., a combination of NN formation configuration elements).

In implementations, the base station 120 synchronizes the neural network table 274 with the neural network table 216 such that the NN formation configuration elements and/or input characteristics stored in one neural network table are replicated in the second neural network table. Alternatively, or additionally, the base station 120 synchronizes the neural network table 274 with the neural network table 216 such that the NN formation configuration elements and/or input characteristics stored in one neural network table represent complementary functionality in the second neural network table (e.g., NN formation configuration elements for transmitter path processing in the first neural network table, NN formation configuration elements for receiver path processing in the second neural network table).

The base station 120 also includes an inter-base station interface 276, such as an Xn and/or X2 interface, which the base station manager 266 configures to exchange user-plane data, control-plane information, and/or other data/information between other base stations, to manage the communication of the base station 120 with the UE 110. The base station 120 includes a core network interface 278 that the base station manager 266 configures to exchange user-plane data, control-plane information, and/or other data/information with core network functions and/or entities.

Configurable Machine-Learning Modules

FIG. 3 illustrates an example operating environment 300 that includes UE 110 and base station 120 that can implement various aspects of UECS federated learning for DNNs. In implementations, the UE 110 and base station 120 exchange communications with one another over a wireless communication system by processing the communications using multiple DNNs.

The base station neural network manager 268 of the base station 120 includes a downlink processing module 302 for processing downlink communications, such as for generating downlink communications transmitted to the UE 110. To illustrate, the base station neural network manager 268 forms deep neural network(s) 304 (DNNs 304) in the downlink processing module 302, as further described. In aspects, the DNNs 304 perform some or all of a transmitter processing chain functionality used to generate downlink communications, such as a processing chain that receives input data, progresses to an encoding stage, followed by a modulating stage, and then a radio frequency (RF) analog transmit (Tx) stage. To illustrate, the DNNs 304 can perform convolutional encoding, serial-to-parallel conversion, cyclic prefix insertion, channel coding, time/frequency interleaving, and so forth. In some aspects, the DNN 304 processes downlink UECS communications.

Similarly, the UE neural network manager 218 of the UE 110 includes a downlink processing module 306, where the downlink processing module 306 includes deep neural network(s) 308 (DNNs 308) for processing (received) downlink communications. In various implementations, the UE neural network manager 218 forms the DNNs 308 as further described. In aspects, the DNNs 308 perform some or all receiver processing functionality for (received) downlink communications, such as complementary processing to the processing performed by the DNNs 304 (e.g., an RF analog receive (Rx) stage, a demodulating stage, a decoding stage). To illustrate, the DNNs 308 can perform any combination of extracting data embedded on the Rx signal, recovering binary data, correcting for data errors based on forward error correction applied at the transmitter block, extracting payload data from frames and/or slots, and so forth.

The base station 120 and/or the UE 110 also process uplink communications using DNNs. In environment 300, the UE neural network manager 218 includes an uplink processing module 310, where the uplink processing module 310 includes deep neural network(s) 312 (DNNs 312) for generating and/or processing uplink communications (e.g., encoding, modulating). In other words, uplink processing module 310 processes pre-transmission communications as part of processing the uplink communications. The UE neural network manager 218, for example, forms the DNNs 312 to perform some or all of the transmitter processing functionality used to generate uplink communications transmitted from the UE 110 to the base station 120.

Similarly, uplink processing module 314 of the base station 120 includes deep neural network(s) 316 (DNNs 316) for processing (received) uplink communications, where the base station neural network manager 268 forms DNNs 316 to perform some or all receiver processing functionality for (received) uplink communications, such as uplink communications received from the UE 110. At times, the DNNs 312 and the DNNs 316 perform complementary functionality of one another.

Generally, a deep neural network (DNN) corresponds to groups of connected nodes that are organized into three or more layers. The nodes between layers are configurable in a variety of ways, such as a partially connected configuration where a first subset of nodes in a first layer are connected with a second subset of nodes in a second layer, or a fully connected configuration where each node in a first layer is connected to each node in a second layer, etc. The nodes can use a variety of algorithms and/or analysis to generate output information based upon adaptive learning, such as single linear regression, multiple linear regression, logistic regression, step-wise regression, binary classification, multiclass classification, multivariate adaptive regression splines, locally estimated scatterplot smoothing, and so forth. At times, the algorithm(s) include weights and/or coefficients that change based on adaptive learning. Thus, the weights and/or coefficients reflect information learned by the neural network.

A neural network can also employ a variety of architectures that determine what nodes within the neural network are connected, how data is advanced and/or retained in the neural network, what weights and coefficients are used to process the input data, how the data is processed, and so forth. These various factors collectively describe a NN formation configuration. To illustrate, a recurrent neural network, such as a long short-term memory (LSTM) neural network, forms cycles between node connections in order to retain information from a previous portion of an input data sequence. The recurrent neural network then uses the retained information for a subsequent portion of the input data sequence. As another example, a feed-forward neural network passes information to forward connections without forming cycles to retain information. While described in the context of node connections, it is to be appreciated that the NN formation configuration can include a variety of parameter configurations that influence how the neural network processes input data.

A NN formation configuration of a neural network can be characterized by various architecture and/or parameter configurations. To illustrate, consider an example in which the DNN implements a convolutional neural network. Generally, a convolutional neural network corresponds to a type of DNN in which the layers process data using convolutional operations to filter the input data. Accordingly, the convolutional NN formation configuration can be characterized with, by way of example and not of limitation, pooling parameter(s) (e.g., specifying pooling layers to reduce the dimensions of input data), kernel parameter(s) (e.g., a filter size and/or kernel type to use in processing input data), weights (e.g., biases used to classify input data), and/or layer parameter(s) (e.g., layer connections and/or layer types). While described in the context of pooling parameters, kernel parameters, weight parameters, and layer parameters, other parameter configurations can be used to form a DNN. Accordingly, a NN formation configuration can include any other type of parameter that can be applied to a DNN that influences how the DNN processes input data to generate output data.

Figure 4:
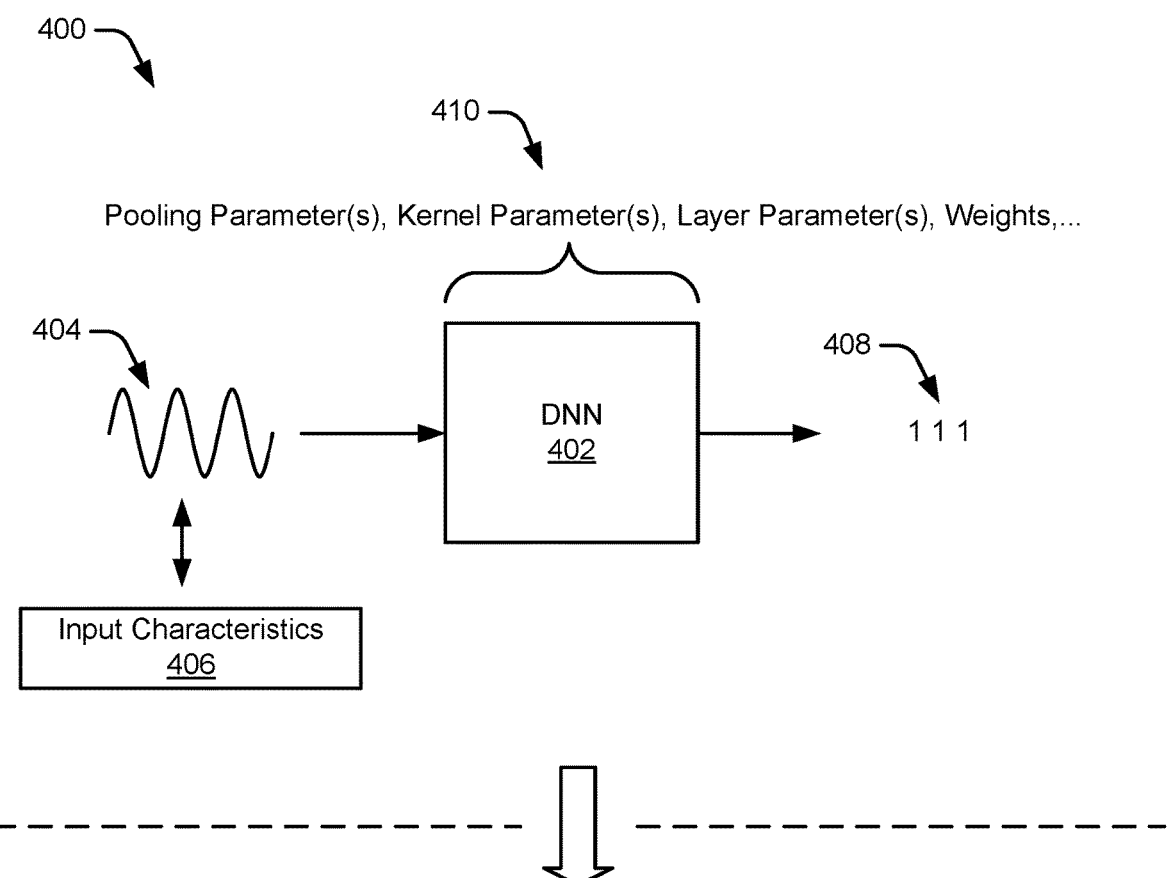
FIG. 4 illustrates an example of generating multiple neural network formation configurations in accordance with aspects of UECS federated learning for DNNs.

FIG. 4 illustrates an example 400 that describes aspects of generating multiple NN formation configurations in accordance with UECS federated learning for DNNs. At times, various aspects of the example 400 are implemented by any combination of the training module 272, the base station neural network manager 268, the training module 222, and/or the UE federated learning manager 220 of FIG. 2.

The upper portion of FIG. 4 includes a DNN 402 that represents any suitable DNN used to implement UECS federated learning for DNNs. In implementations, a neural network manager 218, 268 determines to generate different NN formation configurations, such as NN formation configurations for processing UECS communications. Alternatively, or additionally, the neural network manager generates NN formation configurations based on different transmission environments and/or transmission channel conditions. Training data 404 represents an example input to the DNN 402, such as data corresponding to a downlink communication and/or uplink communication with a particular operating configuration and/or a particular transmission environment. To illustrate, the training data 404 can include digital samples of a downlink wireless signal, recovered symbols, recovered frame data, binary data, etc. In some implementations, the training module generates the training data mathematically or accesses a file that stores the training data. Other times, the training module obtains real-world communications data. Thus, the training module can train the DNN 402 using mathematically generated data, static data, and/or real-world data. Some implementations generate input characteristics 406 that describe various qualities of the training data, such as an operating configuration, transmission channel metrics, UE capabilities, UE velocity, a number of UEs participating in a UECS, an estimated location of a target UE in the UECS, an estimated location of a coordinating UE in the UECS, a type of local wireless link used by the UECS, and so forth.

The DNN 402 analyzes the training data and generates an output 408 represented here as binary data. Some implementations iteratively train the DNN 402 using the same set of training data and/or additional training data that has the same input characteristics to improve the accuracy of the machine-learning module. During training, the machine-learning module modifies some or all of the architecture and/or parameter configurations of a neural network included in the machine-learning module, such as node connections, coefficients, kernel sizes, etc. At some point in the training, the training module determines to extract the architecture and/or parameter configurations 410 of the neural network (e.g., pooling parameter(s), kernel parameter(s), layer parameter(s), weights), such as when the training module determines that the accuracy meets or exceeds a desired threshold, the training process meets or exceeds an iteration number, and so forth. The training module then extracts the architecture and/or parameter configurations from the machine-learning module to use as a NN formation configuration and/or NN formation configuration element(s). The architecture and/or parameter configurations can include any combination of fixed architecture and/or parameter configurations, and/or variable architectures and/or parameter configurations.

The lower portion of FIG. 4 includes a neural network table 412 that represents a collection of NN formation configuration elements, such as neural network table 216 and/or neural network table 274 of FIG. 2. The neural network table 412 stores various combinations of architecture configurations, parameter configurations, and input characteristics, but alternative implementations omit the input characteristics from the table. Various implementations update and/or maintain the NN formation configuration elements and/or the input characteristics as the DNN learns additional information. For example, at index 414, the neural network manager and/or the training module updates neural network table 412 to include architecture and/or parameter configurations 410 generated by the DNN 402 while analyzing the training data 404. At a later point in time, the neural network manager selects one or more NN formation configurations from the neural network table 412 by matching the input characteristics to a current operating environment and/or configuration, such as by matching the input characteristics to current channel conditions, the number of UEs participating in a UECS or a number of UEs in a subset of UEs from the UECS, an estimated location of a target UE in the UECS, an estimated location of a coordinating UE in the UECS, a type of side link used by the UECS, UE capabilities, UE characteristics (e.g., velocity, location, etc.) and so forth.

UECS DNNs

A UECS enhances a target UE's ability to transmit and receive communications with a base station by generally acting as a distributed antenna for a target UE. To illustrate, a base station transmits, using a wireless network, downlink data packets using radio frequency (RF) signals to the multiple UEs in the UECS. A portion or all of the UEs in the UECS receive and demodulate the RF signals into an analog baseband signal and sample the baseband signal to produce a set of in-phase and quadrature (I/Q) samples. Each UE transmits the I/Q samples to a coordinating UE over a side link and/or a local wireless connection. In aspects, the UEs transmit timing information with the I/Q samples. Using the timing information, the coordinating UE time-aligns and combines the I/Q samples and processes the combined I/Q samples to decode the user-plane data for the target UE. The coordinating UE then transmits the data packets to the target UE over the side link and/or local wireless connection.

Similarly, when the target UE has uplink data to transmit to the base station, the target UE transmits the uplink data to the coordinating UE, which uses the side link/local wireless connection to distribute the uplink data to multiple UE in the UECS. In some aspects, each UE in the UECS synchronizes with the base station for timing information and a data transmission resource assignment. The multiple UEs in the UECS then jointly transmit the uplink data to the base station. The base station receives the jointly transmitted uplink data from the multiple UEs and processes the (combined) received signal to decode the uplink data from the target UE. By having the multiple UEs form a UECS for joint transmission and reception of data intended for a target UE, the UEs in the UECS coordinate in a manner similar to a distributed antenna for the target UE to improve the effective signal quality between the target UE and the base station.

Figure 5:
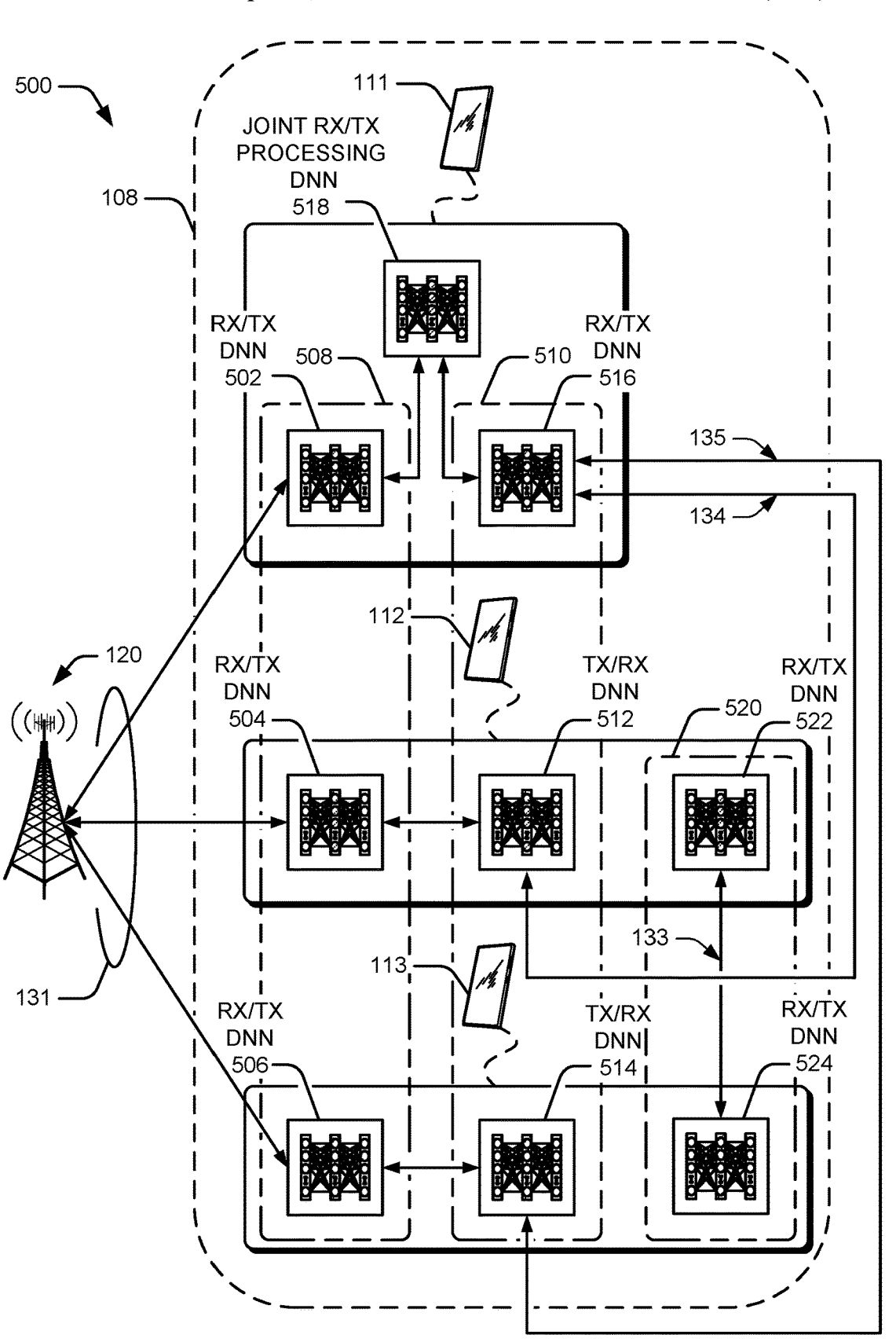
FIG. 5 illustrates an example operating environment in accordance with various aspects of UECS federated learning for DNNs.

FIG. 5 illustrates an example environment 500 in which UECS federated learning for DNNs can be implemented in accordance with various aspects. The environment 500 includes the base station 120 and the UECS 108 of FIG. 1, where the UE 111, the UE 112, and the UE 113 of FIG. 1 form the UECS 108. While the environment 500 shows a single base station 120, alternative or additional aspects of UECS federated learning for DNNs can use multiple base stations (e.g., in a dual connectivity mode).

In aspects of UECS federated learning for DNNs, a federated learning manager (e.g., UE federated learning manager 220) determines common UECS ML configuration(s) for one or more DNNs that process UECS communications (e.g., joint reception, joint transmission) based on updated ML configuration information from UEs in the UECS. In some aspects, the federated learning manager determines the common UECS ML configuration(s) for a subset of UEs in the UECS with common characteristics (e.g., signal quality, hardware capabilities, location, processing capabilities). Alternatively, or additionally, the federated learning manager determines the common UECS ML configuration(s) for all the UEs included in the UECS.

To illustrate, the UE federated learning manager 220 (not illustrated in FIG. 5) receives updated ML configuration information from one or more UEs as further described with reference to FIGS. 6-13, and aggregates and/or combines the updated ML configuration information to determine common UECS ML configuration(s) that correspond to: (a) adjustments to existing ML configurations, such as small adjustments using parameter updates (e.g., coefficients, weights) to tune existing UECS DNN(s) based on the feedback and/or (b) ML architecture changes (e.g., number of layers, layer down-sampling configurations, adding or removing fully convolutional layers) to reconfigure one or more UECS DNN(s). For clarity, the environment 500 illustrates the various UECS DNNs as bi-directional DNNs that process bi-directional UECS communications (e.g., downlink and uplink communications), but in alternative or additional implementations, the UECS DNNs process single-directional UECS communications, such as a first UECS DNN that only processes downlink UECS communications from a base station, a second UECS DNN that only processes uplink UECS communications to the base station, a third UECS DNN that only processes outgoing (e.g., transmitted) side-link UECS communications to a coordinating UE and/or another UE, a fourth UECS DNN that only processes incoming (e.g., received) side-link UECS communications from a coordinating UE and/or another UE, a fifth UECS DNN for joint receive processing that receives and combines I/Q samples from UEs, a sixth UECS for joint transmit processing that receives user-plane data and/or control information from a target UE and forwards the user-plane data and/or control information to UEs, and so forth.

To illustrate, the UE 111, the UE 112, and the UE 113 use a first baseline ML configuration to form a bi-directional DNN that processes communications exchanged with the base station 120 (e.g., receives downlink communications and transmits uplink communications). The UE 111 acts as a coordinating UE for the UECS 108 and forms a first DNN, labeled as receive/transmit DNN 502 (RX/TX DNN 502) using the first baseline ML configuration, the UE 112 forms a second DNN, labeled as receive/transmit DNN 504 (RX/TX DNN 504) using the first baseline ML configuration, and the UE 113 forms a third DNN, labeled as receive/transmit DNN 506 (RX/TX DNN 506), using the first baseline ML configuration. This allows each UE to use local data to generate updated ML configuration information for a respective DNN formed using a same configuration as the other UEs/DNNs, and further allows a federated learning manager (e.g., the UE federated learning manager 220) to aggregate and/or combine the updated ML configuration information and determine a common UECS ML configuration for multiple DNNs (e.g., RX/TX DNN 502, the RX/TX DNN 504, and the RX/TX DNN 506) that improves the processing and/or exchange of UECS communications.

The RX/TX DNN 502, the RX/TX DNN 504, and the RX/TX DNN 506 form a first set of DNNs 508 directed to processing communications exchanged using the wireless network associated with the base station 120. To illustrate, the RX/TX DNNs 502, 504, and 506 process downlink and/or uplink communications exchanged over the wireless network associated with the base station 120, such as by performing at least some receiver chain operations and/or transmitter chain operations. As one example, the first set of DNNs 508 receives digital samples of a downlink wireless signal (or a down-converted version of the downlink wireless signal) from an analog-to-digital converter (ADC) and generate I/Q samples. Alternatively, or additionally, the first set of DNNs 508 generates a modulated uplink wireless signal, such as by generating digital samples and using the digital samples to form and transmit an analog wireless signal directed to the base station 120 and/or applies timing adjustments to the uplink transmission.

In aspects, the UEs in the UECS form a second set of DNNs 510 that process communications exchanged using a side link (e.g., a local wireless connection, assigned air interface resources of a cellular network for side-link/intra-UECS communications). As one example, at least some of the DNNs in the second set of DNNs 510 receive the I/Q samples generated by DNNs included in the set of DNNs 508 and process the I/Q samples for transmission over the side link to a coordinating UE. To illustrate, assume in the environment 500 that the base station 120 directs the UE 111 to act as the coordinating UE of the UECS 108. As shown in FIG. 5, the UE 112 forms a fourth DNN, labeled as transmit/receive DNN 512 (TX/RX DNN 512), such as by using a second baseline ML configuration. The TX/RX DNN 512 operates as a side-link DNN that receives the output generated by the RX/TX DNN 504 and processes the output to generate a transmission over the local wireless connection to the coordinating UE using the local wireless connection 134. Alternatively, or additionally, the TX/RX DNN 512 receives user-plane data and/or control information (generated by the target UE and from the coordinating UE) over the corresponding side link and forwards the user-plane data and/or control information to a complementary DNN (e.g., RX/TX DNN 504).

Similarly, the UE 113 forms a fifth DNN, labeled as transmit/receive DNN 514 (TX/RX DNN 514), using the second baseline ML configuration. The TX/RX DNN 514 also operates as a side-link DNN that receives the output (e.g., I/Q samples) generated by the RX/TX DNN 506 and processes the output to generate a transmission over the local wireless connection and/or side link to the coordinating UE using the local wireless connection 135. Alternatively, or additionally, the TX/RX DNN 514 receives the user-plane data and/or control information over the corresponding side link and forwards the user-plane data and/or control information to a complementary DNN (e.g., RX/TX DNN 506).

The UE 111, as the coordinating UE, forms, as part of the second set of DNNs 510, a sixth DNN, labeled as receive/transmit DNN 516 (RX/TX DNN 516), that operates as a side-link RX DNN for receiving incoming UECS communications from various UEs over the local wireless connection and/or side link, such as by performing various receiver chain operations. To illustrate, the RX/TX DNN 516 decodes and/or extracts the I/Q samples received from the UE 112 and/or the UE 113. Alternatively, or additionally, the RX/TX DNN 516 operates as a side-link TX DNN that processes and/or generates outgoing UECS communications, such as by forwarding user-plane data and/or control information (generated by a target UE) over the side link and/or local wireless connection to the UEs and/or by performing various transmitter chain operations.

The UE 111, as the coordinating UE, also forms a seventh DNN, labeled as joint receive/transmit processing DNN 518

(joint RX/TX processing DNN 518). In aspects, the joint RX/TX processing DNN 518 receives the baseband I/Q samples generated by various UEs in the UECS and combines the I/Q samples as further described. For example, the joint RX/TX processing DNN 518 receives a first set of I/Q samples generated by the (co-resident) RX/TX DNN 502, a second set of I/Q samples from the UE 112 received over the local wireless connection 134 and through the RX/TX DNN 516, and a third set of I/Q samples from the UE 113 received over the local wireless connection 135 and through the RX/TX DNN 516. The joint RX/TX processing DNN 518 then combines the I/Q samples and processes the combined I/Q samples to recover user-plane data and/or control-plane information intended for the target UE from the downlink communication. Afterwards, if the target UE is separate from the coordinating UE 111, the joint RX/TX processing DNN 518 forwards the recovered user-plane data and/or control-plane information to the RX/TX DNN 516 for transmission over the side link and/or local wireless connection to the target UE. Alternatively, or additionally, the joint RX/TX processing DNN 518 receives and processes uplink user-plane data and/or control-plane information from a target UE and forwards I/Q samples (corresponding to the user-plane data and/or control-plane information) to the UEs.

In various aspects, the UE 112 and the UE 113 also use the TX/RX DNN 512 and the TX/RX DNN 514 to communicate directly with one another over a local wireless connection. For example, the UE 112 can use the TX/RX DNN 512 to process an outgoing peer-to-peer communication transmitted over a local wireless connection to the UE 113 and/or process an incoming peer-to-peer communication from the UE 113. Similarly, the UE 113 can use the TX/RX DNN 514 to process an incoming peer-to-peer communication from the UE 112 and/or to process an outgoing peer-to-peer communication to the UE 112. Alternatively or additionally, as illustrated in the environment 500, the UEs form a third set of DNNs 520 using a third baseline ML configuration to process UECS communications exchanged between the UEs, such as for peer-to-peer communications used during peer-to-peer federated learning and/or to establish a side link in anticipation of a change in the coordinating UE from the UE 111 to either the UE 112 or the UE 113. For example, the UE 112 forms the receive/transmit DNN 522 (RX/TX DNN 522), and the UE 113 forms the receive/transmit DNN 524 (RX/TX DNN 524) to exchange communications with one another using the wireless link 133. Thus, in some aspects, the UE 112 and/or the UE 113 reuse the TX/RX DNN 512 and the TX/RX DNN 514 for peer-to-peer communications with one another (not illustrated), while in other aspects, the UE 112 and/or the UE 113 form separate UECS DNNs (RX/TX DNN 522 and RX/TX DNN 524) for processing peer-to-peer communications as illustrated in the environment 500.

Generally, to perform the peer-to-peer federated learning, UEs (e.g., UE 112, UE 113) generate updated ML configuration information for one or more UECS DNNs by running an online or offline training procedure and exchange the updated ML configuration information directly with one another. As another example, one of the UEs receives the updated ML configuration information from select UEs, generates one or more common UECS ML configuration(s) using federated learning techniques, and communicates the common UECS ML configuration(s) to the select UEs. When the UEs include UECS DNNs formed with the same baseline ML configurations (e.g., baseline ML architecture, baseline ML parameters), the UEs can use (peer-to-peer)

federated learning to determine a common UECS ML configuration for updating the UECS DNNs.

To illustrate, assume the UE 112 and the UE 113 each form a respective UECS using a baseline ML configuration. As further described at least at 645 of FIG. 6, each UE detects a trigger event and performs a training procedure (using local data) that generates updated ML configuration information (e.g., updated ML parameters, updated ML architecture) as described at least at 655 of FIG. 6. In aspects, the UE 112 and the UE 113 collaborate to determine a common ML architecture using federated learning techniques. As one example, the UE 113 communicates respective updated ML configuration information to the UE 112 using the side link 133 (and without communicating the updated ML configuration information to the coordinating UE). Alternatively, or additionally, the UE 112 communicates respective updated ML configuration information to the UE 113 using the side link 133. The UE that is designated to generate the common UECS ML configuration, such as by the coordinating UE 111 designating a UE when directing the UEs to perform peer-to-peer federated learning, then aggregates and/or combines the updated ML configuration information by way of the UE federated learning manager 220. The UE 112 and the UE 113 can train any combination of UECS DNNs (e.g., DNN 504, DNN 506, DNN 512, DNN 514, DNN 522, DNN 524) and exchange the corresponding updated ML configuration information with one another over the side link (e.g., wireless link 133). Thus, the UE 112 and UE 113 can exchange updated ML configuration information for DNNs that process peer-to-peer UECS communications, base station-to-UE UECS communications, UE-to-coordinating UE UECS communications, and so forth. The designated UE (e.g., not the coordinating UE) then generates a corresponding common UECS ML configuration using the updated ML configuration information and directs the UEs participating in the peer-to-peer federated learning to update the respective (local) UECS DNNs using the common UECS ML configuration(s).

To illustrate, assume the coordinating UE 111 determines a subset of UEs within the UECS (e.g., UE 112, UE 113) to perform peer-to-peer federated learning, such as by selecting the subset of UEs based on common hardware capabilities, commensurate signal and/or link quality parameters (e.g., within a threshold value or range to one another), UE locations, DNNs with commensurate ML configurations, and so forth. Alternatively, or additionally, the base station 120 selects the subset of UEs to perform the peer-to-peer federated learning and communicates the selected subset of UEs to the coordinating UE 111. Whether selected by the coordinating UE 111 or the base station 120, the coordinating UE 111 directs each of the selected UEs in the subset to perform the peer-to-peer federated learning. In aspects, the coordinating UE 111 indicates a list of the UEs included in the subset to each selected UE. Alternatively, or additionally, the coordinating UE 111 receives an allocation of air interface resources from the base station 120 for peer-to-peer and/or intra-UECS communications and assigns the air interface resources to the selected UEs for the peer-to-peer and/or intra-UECS communications.

UECS Federated Learning for DNNs

FIGS. 6, 7, 8, 9, 10, 11, 12, 13, and 14 illustrate example signaling and control transaction diagrams in accordance with one or more aspects of UECS federated learning for DNNs. In aspects, operations of the signaling and control transactions may be performed by any combination of devices, including a base station (e.g., the base station 120), a coordinating UE (e.g., the UE 111) in a UECS, at least one UE (e.g., UE 112, UE 113) in the UECS, and/or at least one other standalone UE (e.g., not participating in a UECS) using aspects as described with reference to any of FIGS. 1-5.

Figure 6:
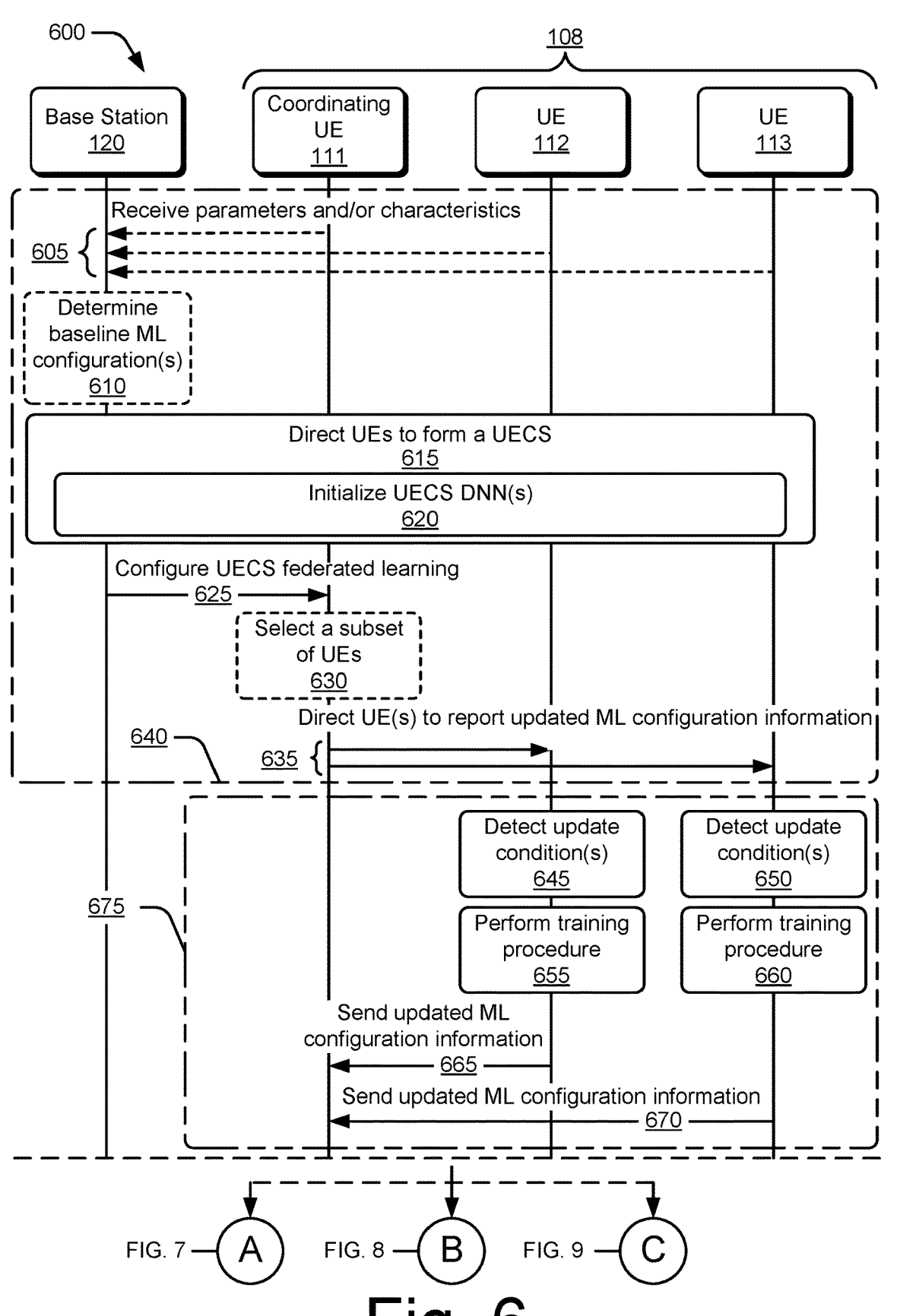
FIG. 6 illustrates an example transaction diagram between various network entities in accordance with various aspects of UECS federated learning for DNNs.
Figure 7:
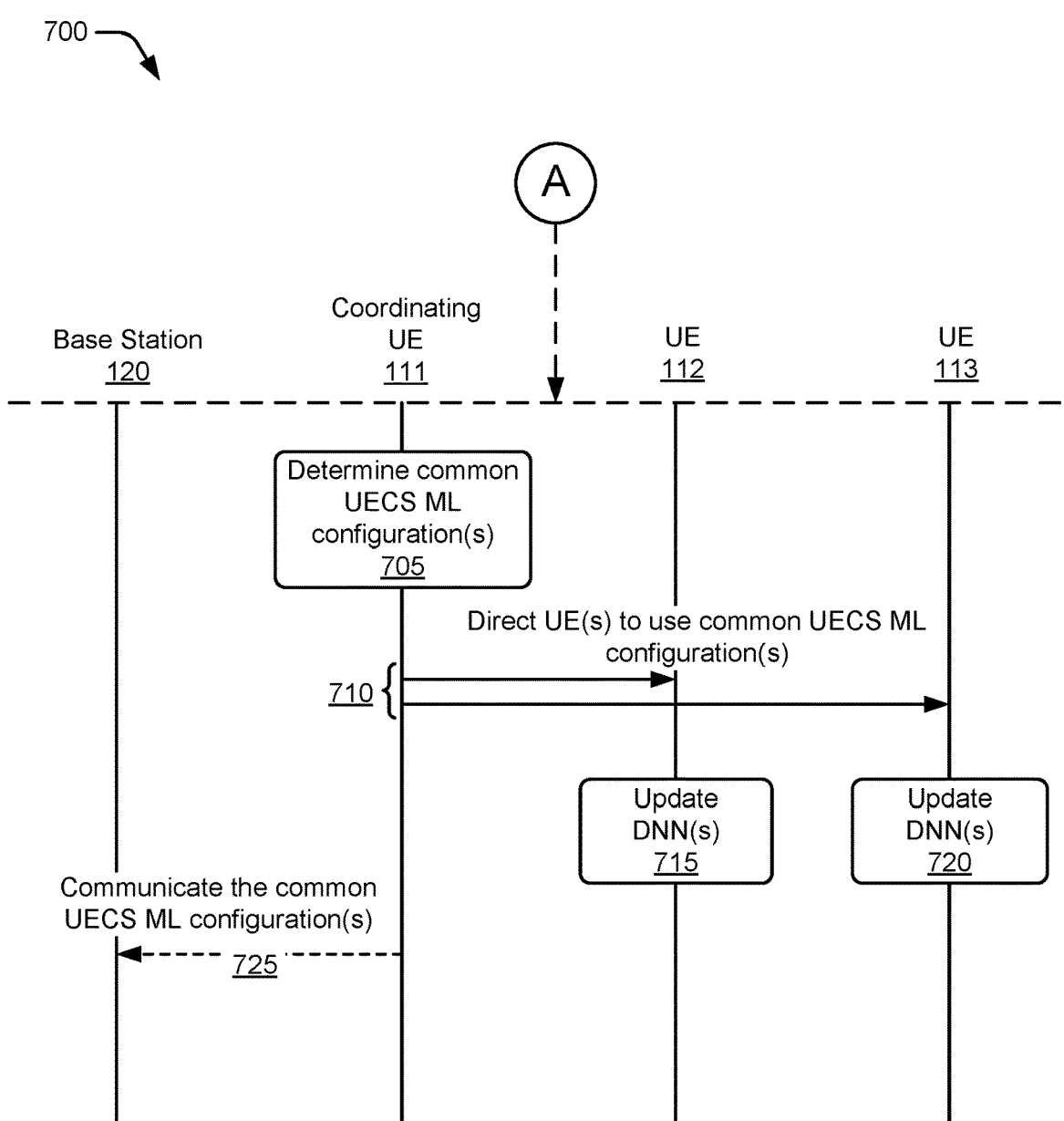
FIG. 7 continues from FIG. 6 and illustrates an example transaction diagram in which a coordinating user equipment (UE) of a UECS determines a common machine-learning (ML) configuration in accordance with various aspects of UECS federated learning for DNNs.
Figure 8:
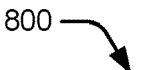
FIG. 8 continues from FIG. 6 and illustrates an example transaction diagram corresponding to a base station determining a common UECS ML configuration in accordance with various aspects of UECS federated learning for DNNs.
Figure 9:
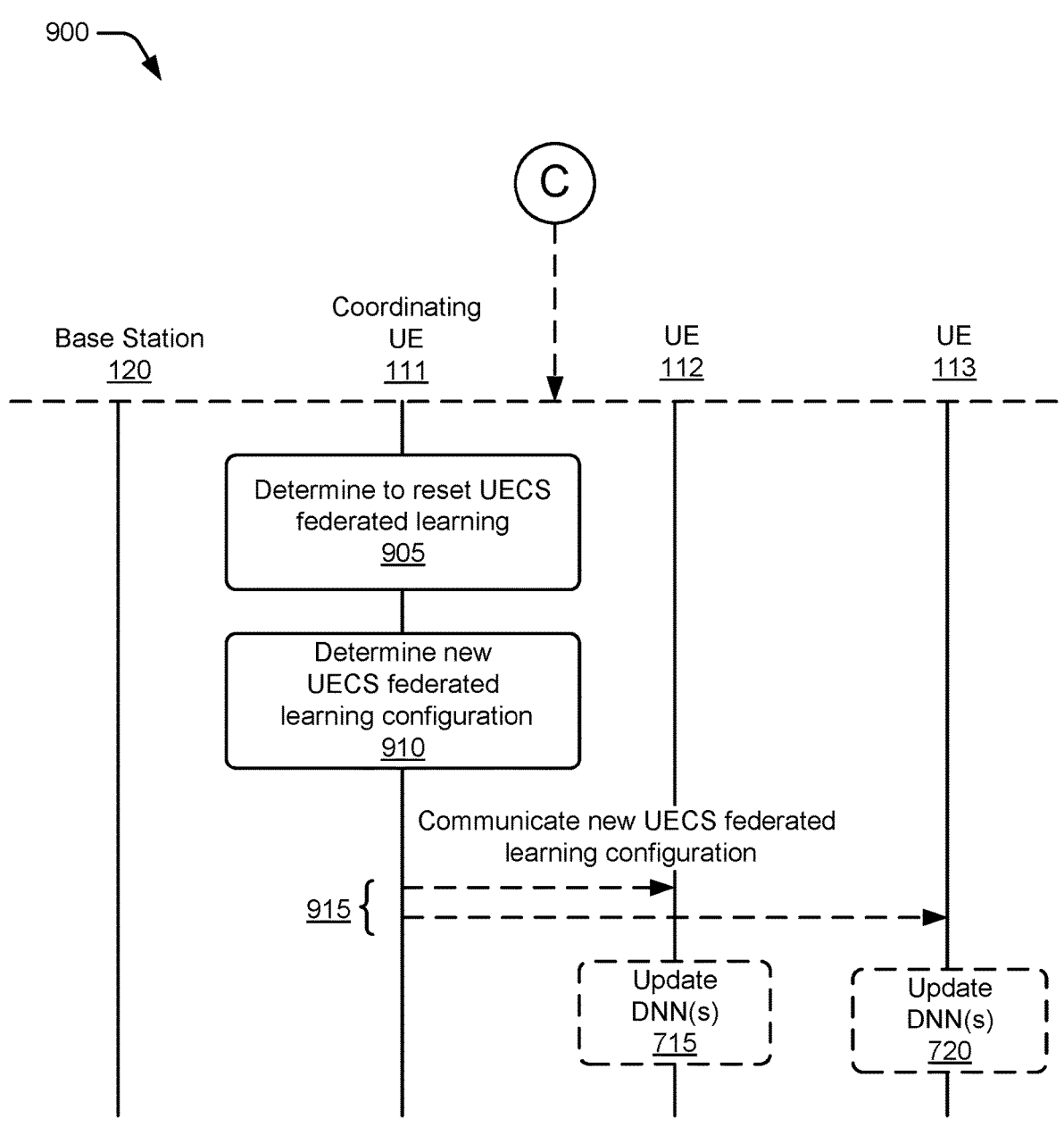
FIG. 9 continues from FIG. 6 and illustrates an example transaction diagram corresponding to a coordinating UE resetting UECS federated learning in a UECS in accordance with various aspects of UECS federated learning for DNNs.

A first example of signaling and control transactions for UECS federated learning for DNNs is illustrated by the signaling and control transaction diagram 600 of FIG. 6, where the diagram 600 leads to: (a) additional signaling and control transactions as illustrated by FIG. 7(b) additional signaling and control transactions as illustrated by FIG. 8, or (c) additional signaling and control transactions as illustrated by FIG. 9. The diagram 600 includes signaling and control transactions among the base station 120, the coordinating UE 111, the UE 112, and the UE 113. As further described, the coordinating UE 111, the UE 112, and the UE 113 are included in the UECS 108. For clarity, the diagram 600 illustrates the UECS 108 as including three UEs, but two or more UEs can be included in the UECS 108. In some aspects, the UE 112 and the UE 113 represent a subset of UEs included in the UECS 108.

As illustrated, at 605, the base station 120 optionally receives UE parameters and/or characteristics from the coordinating UE 111, the UE 112, and/or the UE 113. To illustrate, the base station 120 receives UE capabilities from the coordinating UE 111, the UE 112, and/or the UE 113, such as in response to transmitting a UE capabilities enquiry message (not illustrated). At times, the coordinating UE 111, the UE 112, and/or the UE 113 transmit an indication of ML capabilities (e.g., supported ML architectures, supported number of layers, available processing power, memory limitations, available power budget, fixed-point processing vs. floating-point processing, maximum kernel size capability, computation capability). Alternatively, or additionally, the coordinating UE 111, the UE 112, and/or the UE 113 transmit signal and/or link quality parameters, estimated UE-locations (e.g., an average estimated location of the UECS, an estimated location of each UE included in the UECS), a battery level, a temperature, and so forth. This can include each UE communicating with the base station 120 independently from one another or can include the coordinating UE 111 receiving the parameters and/or characteristics from each UE and forwarding the accumulated parameters and/or characteristics to the base station 120.

In some aspects, the base station 120 determines to form the UECS 108 based on the parameters and/or characteristics received at 605. For instance, the base station determines to form the UECS 108 using at least the UEs 111, 112, and 113 based on any combination of the parameters and/or characteristics received at 605, such as signal strength, location, and so forth. Alternatively, or additionally, the base station 120 forms the UECS 108 using a combination of signaling and control transactions with the selected UEs (not illustrated in FIG. 6) that direct the UEs to join the UECS. The base station 120 can also select and/or designate which UE in the UECS 108 acts as the coordinating UE based on the parameters and/or characteristics. To illustrate, the base station 120 determines that the UE 111 has a higher signal strength relative to the UE 112 and UE 113 and selects the UE 111 to act as the coordinating UE. Alternatively, or additionally, the UE 111 sends a request to the base station 120 to act as the coordinating UE. In aspects, the base station 120 may dynamically reconfigure the UECS, such as by changing which UEs participate in the UECS (e.g., add and/or remove participating UEs) and/or by changing which UE acts as the coordinating UE of the UECS.

At 610, the base station 120 optionally determines, by way of the BS neural network manager 268, one or more baseline ML configurations for UECS DNNs that process UECS communications as described with reference to FIG. 5. As one example, the base station identifies, from the UE parameters and/or characteristics received at 605, a subset of UEs that have common hardware capabilities, have commensurate signal and/or link quality parameters (e.g., within a threshold value or range to one another), are co-located within a threshold value to one another, and so forth. The base station 120 uses the parameters and/or characteristics to identify one or more baseline ML configurations for the subset of UEs, such as by analyzing a neural network table based on the UE parameters and/or characteristics. For example, base station 120 analyzes ML capabilities received at 605 (e.g., supported ML architectures, supported number of layers, available processing power, memory/storage capabilities, available power budget, fixed-point processing vs. floating-point processing, maximum kernel size capability, computation capability), and selects a baseline ML configuration based on common ML capabilities supported by the UEs 111, 112, and/or 113. The base station can determine any combination of baseline ML configurations, such as a first baseline ML configuration for a first DNN that processes downlink wireless communications from the base station, a second baseline ML configuration for a second DNN that processes outgoing side-link UECS communications to a coordinating UE, a third baseline ML configuration for peer-to-peer communications (e.g., UE-to-UE, coordinating UE-to-coordinating UE), and so forth.

At 615, the base station 120 directs at least the UE 111, UE 112, and the UE 113 to form a UECS. This can include multiple signaling and control transactions not illustrated here for visual brevity, such as signaling and control transactions corresponding to the base station 120 communicating directly with each UE (e.g., a command to join a UECS, a command to act as a coordinating UE for the UECS). Alternatively, or additionally, each UE communicates directly with the base station 120 (e.g., confirmations to the commands). After the UE 111, the UE 112, and the UE 113 form the UECS, communications between the base station and the UEs included in the UECS can use joint transmission and/or reception of network data for a target UE within the UECS as further described. Thus, the diagram 600 can include additional signaling and control transactions that are omitted for simplicity's sake. As one example, the UEs 111, 112, and 113 can jointly receive transmissions from the base station 120 at 625 and locally transmit I/Q samples over a side link to the coordinating UE (e.g., UE 111) for decoding.

In some aspects, as part of directing the UEs to form the UECS, the base station 120 initializes one or more UECS DNNs at 620. Alternatively, or additionally, the base station 120 initializes the UECS DNNs separately from the signaling and control transactions used to form the UECS at 615. To illustrate, the base station 120 sometimes determines to initialize UECS DNNs for an existing UECS based on a decision to direct the existing UECS to perform federated learning as further described.

As part of initializing the UECS DNNs at 620, the base station 120 sometimes communicates the baseline ML configuration(s) determined at 610 to the coordinating UE 111 and directs the UE 111 to communicate the baseline ML configuration(s) to all UEs included in the UECS 108, or a subset of UEs included in the UECS 108. For example, the base station 120 communicates index value(s) into a neural network table to the coordinating UE 111. Alternatively, or additionally, the base station 120 communicates the baseline ML configuration(s) directly to the selected UEs (e.g., all or a subset). In some aspects, the base station 120 instead communicates UE-specific ML configurations, where the base station 12—selects a particular UE-specific ML configuration for a particular UE, such as based on UE capabilities.

At 625, the base station 120 configures federated learning for the UECS 108. To illustrate, the base station 120 communicates federated learning parameters to the coordinating UE 111. As one example, the base station 120 determines and/or assigns air interface resources for sidelink and/or intra-UECS communications between devices in the UECS 108 (e.g., UE 111 and UE 112, UE 111 and UE 113, UE 112 and UE 113) and communicates the determined/assigned air interface resources to the coordinating UE 111. As another example, the base station 120 directs the UEs in the UECS to utilize a local wireless connection. Alternatively, or additionally, the base station 120 communicates UE subset configurations identified through the parameters and/or characteristics received at 605 (e.g., a number of UE subsets, which UEs are in which subsets, subset characteristics). In some aspects, the base station 120 communicates one or more update conditions (e.g., a trigger event, a schedule) that specify when to perform a training procedure and/or when to report updated UECS ML configuration information. In aspects, the base station 120 indicates, to the coordinating UE, when to start UECS federated learning (e.g., combine updated ML configuration information from various UEs) and when to stop UECS federated learning. The base station 120 can also indicate, as part of the UECS federated learning parameters, peer-to-peer configurations between UEs.

In some aspects, the coordinating UE 111 optionally determines one or more subsets of UEs at 630. For example, the coordinating UE 111 determines the subset of UEs based on UE capabilities of UEs within the UECS and/or common channel conditions of UEs within the UECS (indicated by signal or link quality parameters). To illustrate, the coordinating UE 111 requests and receives an indication of UE hardware configurations (not illustrated) and selects, by way of the UE neural network manager 218 and/or the federated learning manager 220, a subset of UEs based upon common hardware capabilities, such as a common number of receive (RX) antenna, a common number of transmit (TX) antenna, or a common UE-category (e.g., a category that describes UE support for any combination of: downlink capability, uplink capability, maximum supported data rate, supported downlink multiple-input, multiple-output (MIMO) layers, quadrature-amplitude modulation (QAM) support, and so forth).

At 635, the coordinating UE 111 directs the selected UEs within the UECS (e.g., UE 112, UE 113) to report updated UECS ML configuration information. This can include directing one or more subsets of UEs (included in the UECS) or all UEs in the UECS. In some aspects, the coordinating UE 111 communicates, to each of the selected UEs, one or more update conditions for reporting the updated DNN information, such as the update conditions received at 625. For example, the coordinating UE 111 directs each of the selected UEs to perform a training procedure and/or to transmit updated ML configuration information in response to identifying a trigger event (e.g., changing ML parameters, changing ML architectures, changing signal or link quality parameters, changing UE-location). As another example, the coordinating UE 111 directs each of the selected UEs to perform the training procedure and/or to transmit updated ML configuration information based on a schedule, such as a periodic schedule.

In aspects, the coordinating UE 111 implicitly and/or explicitly directs each selected UE to report the updated UECS ML configuration information. To illustrate, the coordinating UE 111 implicitly requests each selected UE to report the updated ML configuration information (and/or to perform the training procedure) by indicating the one or more update conditions that specify rules or instructions on when to report the updated UECS ML configuration information. Alternatively, or additionally, the coordinating UE 111 explicitly requests each selected UE to report the updated ML configuration information using an explicit message or flag in the message.

In aspects, the coordinating UE 111 directs each selected UE to perform an online training procedure, such as an online training procedure that trains the DNNs while processing the UECS communications. In other aspects, the coordinating UE 111 directs each selected UE to perform an offline training procedure that uses stored data and while the DNN is not processing the UECS communications. Thus, in some aspects, the coordinating UE 111 directs the selected UEs on when to perform the training procedure and/or whether to perform online or offline training.

As one example of an update condition, the coordinating UE 111 requests each selected UE to transmit updated ML configuration information (and/or to perform the training procedure) using a periodic schedule and indicates a recurrence time interval. As another example update condition, the coordinating UE 111 requests each selected UE to transmit the updated ML configuration information (and/or to perform the training procedure) in response to detecting a trigger event, such as trigger events that correspond to changes in a DNN at a UE. To illustrate, the coordinating UE 111 requests each selected UE to transmit updated ML configuration information when the UE determines that an ML parameter (e.g., a weight or coefficient) has changed more than a threshold value. As another example, the coordinating UE 111 requests that each selected UE transmits updated ML configuration information in response to detecting when the DNN architecture changes at the UE, such as when a UE identifies (by way of the UE neural network manager 218 and/or the UE federated learning manager 220) that the DNN has changed the ML architecture by adding or removing a node or layer.

In some aspects, the coordinating UE 111 requests each selected UE to report updated ML configuration information based on UE-observed signal or link quality parameters. To illustrate, the coordinating UE 111 requests, as a trigger event and/or update condition, that each selected UE report updated ML configuration information in response to identifying that a downlink signal and/or link quality parameter (e.g., RSSI, SINR, CQI, channel delay spread, Doppler spread) has changed by, or meets, a threshold value. Thus, the coordinating UE 111 can request synchronized updates (e.g., periodic, schedule(s)) from the selected UEs or asynchronous updates from the selected UEs based on conditions detected at the respective UE. In aspects, the coordinating UE requests the UE report observed signal or link quality parameters along with the updated UECS ML configuration information.

Generally, the transactions at 605, 610, 615, 620, 625, 630, and 635 correspond to a first instance of a sub-diagram 640 that configures UEs in a UECS to perform UECS federated learning by way of a coordinating UE. The sub-diagram 640 can include alternative or additional actions, including varying combinations of the optional transactions as further described.

At 645 and at 650, the UEs 112 and 113, respectively, detect one or more update conditions. In aspects, the UE 112 and/or UE 113 detect the occurrence of the update conditions by way of the UE federated learning manager 220. To illustrate, the UE 112 and/or UE 113 each set a timer in response to receiving the recurrence time duration and detect expiration of the timer. As another example, the UE 112 and/or UE 113 determine that an ML parameter has changed more than a first threshold value by periodically comparing the ML parameter to the first threshold value, that the DNN architecture has changed through a reconfiguration request, or that a signal or link quality parameter has changed by a second threshold value by comparing the quality parameters to the second threshold value (or a difference from a prior value) each time the quality parameters are generated. In some aspects, the UE 112 and/or UE 113 detect a UE location change by a third threshold value. For clarity, the diagram 600 illustrates the UE 112 and/or UE 113 each detecting the update condition(s) contemporaneously, but the UEs 112 and 113 can detect the update conditions at varying times.

At 655 and at 660, the UE 112 and the UE 113 perform a training procedure to generate the updated UECS ML configuration information. To illustrate, the UE 112 and UE 113 perform an offline training procedure using local data or an online training procedure by providing feedback to the UECS DNN(s) (and/or the ML algorithms that form the UECS DNNs) when processing the UECS communications. Alternatively, or additionally, the UEs 112 and 113 continuously perform the online training procedure by continuously providing the feedback to the UECS DNN(s)/ML algorithm(s) while processing the UECS communications and continuously generate the updated UECS ML configuration information. Accordingly, the ordering of these transactions in the diagram 600 (e.g., detecting an update condition, performing a training procedure) is for description purposes and is not intended to be limiting.

At 665 and 670, the UEs 112 and 113 send a message to the coordinating UE 111, where each message indicates the updated ML configuration information generated by the respective UE. To illustrate, the UE 112 and the UE 113 communicate the updated ML configuration information to the coordinating UE 111 using a respective side link (e.g., the wireless link 134 and the wireless link 135). In some aspects, the UEs 112 and 113 each transmit a message that indicates an index value that maps to an entry in a neural network table, an indication of delta update(s) to ML parameters(s) and/or ML architecture(s) of an initial and/or baseline ML configuration used by one or more UEs, or an indication of an absolute ML configuration form ML parameters(s) and/or ML architecture(s). Alternatively, or additionally, the UEs 112 and 113 transmit current UE characteristics (e.g., UE characteristics at the time of training) with the updated UECS ML configuration information, such as signal and/or link quality parameters, UE location, UE hardware configuration, and so forth.

Generally, the transactions 645, 650, 655, 660, 665, and 670 correspond to a sub-diagram 675 where UEs generate updated ML configuration information and communicate the updated ML configuration information to a coordinating UE using side links. The sub-diagram 675 can include alternative or additional transactions.

At this point, the diagram 600 can proceed to at least three alternative paths: option "A" (described in FIG. 7), option "B" (described in FIG. 8), or option "C" (described in FIG. 9). FIG. 7 depicts a signaling and control transaction diagram 700 in which a coordinating UE determines a common UECS ML configuration using UECS federated learning and communicates the common UECS ML configuration to UEs. FIG. 8 depicts a signaling and control transaction diagram 800 in which the coordinating UE receives and distributes an updated common UECS ML configuration determined by a base station. FIG. 9 depicts a signaling and control transaction diagram 900 in which the coordinating UE resets UECS federated learning.

Continuing to option "A" in FIG. 7, at 705, the coordinating UE 111 determines one or more common UECS ML configuration(s). In determining the common UECS ML configuration(s), the coordinating UE 111 applies federated learning techniques that aggregate and/or combine the updated ML configuration information received from the UEs 112 and 113 and without potentially exposing private data used at the UEs to generate the updated UECS ML configuration information. As one example, the coordinating UE 111 performs averaging that aggregates ML parameters, gradients, and so forth. In aspects, the coordinating UE 111 determines a common UECS ML configuration that indicates a (delta) update to the baseline ML configuration used by the subset of UEs, or a common UECS ML configuration that indicates an (absolute) ML configuration that forms a new DNN. The coordinating UE 111 can determine common UECS ML configuration(s) for any of the UECS DNNs as described with reference to FIG. 5.

At 710, the coordinating UE 111 directs the selected UEs (e.g., UE 112, UE 113) to update one or more UECS DNNs using the common UECS ML configuration(s) determined at 705. To illustrate, the coordinating UE 111 transmits an indication of an index value into a neural network table using one or more side links (e.g., wireless link 134, wireless link 135), where the index value maps to a table entry that specifies the common UECS ML configuration (e.g., ML parameters and/or ML architecture(s)).

At 715 and at 720, the UE 112 and the UE 113, respectively, update one or more UECS DNNs using the common UECS ML configuration(s). For example, the UE 112 and the UE 113, by way of a respective UE neural network manager 218, each access a local neural network table and index value to extract the common UECS ML configuration and form (or update) the UECS DNNs.

At 725, the coordinating UE 111 optionally communicates the common UECS ML configuration to the base station 120. As one example, the coordinating UE 111 communicates an index value to the base station 120, as further described. Alternatively, or additionally, the coordinating UE 111 communicates common characteristics of the selected UEs that contributed to the updated ML configuration information used to generate the common UECS ML configuration. For instance, the coordinating UE 111 communicates common hardware capabilities, common ML capabilities, common UE capabilities, commensurate signal/ link quality parameters, commensurate UE locations, and so forth.

Returning to the completion of the sub-diagram 675 of FIG. 6, the diagram can proceed alternatively to option "B," which is described in FIG. 8. Similar to that described with reference to FIG. 7, the coordinating UE 111 determines one or more common UECS ML configuration(s) at 705 and communicates the common UECS ML configuration(s) to the base station 120 at 725. In communicating the common UECS ML configuration(s) to the base station 120, the coordinating UE 111 can communicate common characteristics of the selected UEs as further described.

At 805, the base station 120 determines one or more updated common UECS ML configuration(s) using federated learning techniques. For example, and with reference to FIG. 12, the base station 120 aggregates and/or combines the common UECS ML configuration received from the coordinating UE of a first UECS (e.g., UECS 108) with a second common UECS ML configuration received from a second coordinating UE of a second UECS. As another example, and with reference to FIG. 13, the base station 120 aggregates and/or combines the common UECS ML configuration with updated ML configuration information received from a non-UECS UE (e.g., a UE not included or participating in a UECS). In aspects, the base station 120 applies federated learning techniques to any combination of common UECS ML configurations (e.g., generated by UECSs) and/or updated ML configuration information generated by a non-UECS UE with characteristics common to the UECS(s) characteristics. To illustrate, the base station 120 analyzes the UECS common characteristics received from the coordinating UE at 725 and aggregates and/or combines the common UECS ML configuration with additional ML configuration information generated by UEs and/or UECSs with common and/or commensurate (e.g., within a range or threshold value) characteristics to generate the updated common UECS ML configuration. This can include the base station 120 performing averaging or other functions (e.g., weighted mean, minimizing and/or maximizing, least squares, regularization) that aggregates ML parameters, gradients, and so forth, to determine a delta or absolute ML configuration as the updated common UECS ML configuration.

At 810, the base station 120 communicates the updated common UECS ML configuration to the coordinating UE 111, such as through a radio resource control (RRC) message or a Non-Access Stratum (NAS) message. As one example, the base station 120 communicates an index value into a neural network table, as further described.

At 815, based on receiving the updated common UECS ML configuration(s), the coordinating UE 111 directs the selected UEs to update one or more UECS DNNs using the updated common UECS ML configuration(s). Similar to that described at 710 of FIG. 7, the coordinating UE 111 transmits an indication of an index value into a neural network table using one or more side links (e.g., wireless link 134, wireless link 135). The selected UEs then update their respective DNNs using the updated common UECS ML configuration at 715 and at 720, such as by accessing a local neural network table and using the received index value to extract the updated common UECS ML configuration generated by the base station 120.

Returning to the completion of the sub-diagram 675 of FIG. 6, the diagram can proceed alternatively to option "C," which is described in FIG. 9. At 905, the coordinating UE 111 determines to reset the UECS federated learning (e.g., select a new subset of UEs to include in the UECS federated learning, determine a new baseline ML configuration) instead of, and/or in addition to, determining a common UECS ML configuration as described at 705 of FIG. 7 and FIG. 8. To illustrate, assume the base station 120 does not determine the baseline ML configuration as described at 610. Instead, the base station 120 determines UE-specific ML configurations such that each UE in the UECS forms one or more DNN distinct from DNNs formed by other UEs participating in the UECS. Alternatively or additionally, assume the operating conditions of a UE (e.g., one of the UE

111, UE 112, and/or UE 113) changes significantly, such as by the UE moving to a location with poor signal and/or link quality parameters relative to the other UEs participating in the UECS. In either of these scenarios, the updated ML configuration information generated by the UEs may differ from one another such that the common UECS ML configuration determined by the coordinating UE 111 forms a UECS DNN with degraded processing performance instead of improved processing performance (relative to a current UECS DNN at the UE contributing the updated ML configuration information).

In aspects, the coordinating UE 111 identifies that the updated ML configuration information from at least one UE deviates from other (received) updated ML configuration information (e.g., by a threshold value that indicates unacceptable deviation) and determines to reset the UECS federated learning. As one example, the coordinating UE 111 analyzes the UE characteristics received with the updated ML configuration information at 665 and 670, and determines that the value of at least one of the UE characteristics (e.g., signal and/or link quality parameters, UE location, UE hardware configuration) from a first UE differs from the same UE characteristic from other UEs by a threshold value or falls outside of a range of values defined as being acceptable. For instance, the coordinating UE 111 determines that a first SINR value for a first UE differs from second and third SINR values from other UEs by more than a threshold value. As another example, the coordinating UE performs an analysis on the updated ML configuration information from the various UEs and determines the updated ML configuration information from the first UE has a local minima different (by a threshold value that signifies an acceptable deviation) from the updated ML configuration information received from other UE(s). As yet another example, the coordinating UE 111 determines that a UE in the UECS and/or subset of UEs utilizes a UE-specific ML configuration that supports a different processing model, such processing model for a different MIMO scheme than the other UEs. Based on determining that the updated ML configuration information from at least one UE differs from others by a metric that indicates a significant deviation, the coordinating UE determines to reset the UECS federated learning for the UECS.

At 910, the coordinating UE 111 determines a new UECS federated learning configuration. As one example, the coordinating UE 111 selects a new subset of UEs to include in a UECS federated learning group, such as that described at 630 of FIG. 6. Alternatively, or additionally, the coordinating UE 111 determines one or more new baseline ML configurations that form UECS DNN(s). To illustrate, and similar to that described at 610 of FIG. 6, the coordinating UE 111 analyses a neural network table using the UE characteristics (e.g., common UE characteristics for a new subset, current common UE characteristics of a current UECS) received at 665 and/or at 670 to select the new baseline ML configuration(s). In some aspects, the coordinating UE 111 determines to direct at least two UEs with UE characteristics and/or updated ML configuration information with similar local minima within a threshold value to one another to perform peer-to-peer federated learning, such as that described with reference to FIG. 14.

At 915, the coordinating UE 111 optionally communicates the new UECS federated learning configuration to one or more UEs within the UECS. For example, similar to that described at 710 of FIG. 7, the coordinating UE 111 communicates the new baseline ML configuration by transmitting an index value using one or more side links (e.g., wireless link 134, wireless link 135), where the index value maps to an entry in a neural network table. In response to receiving an indication of the new baseline ML configuration, the UE 112 and/or the UE 113 optionally update one or more UECS DNNs at 715 and at 720, respectively. As another example of communicating the new federated learning configuration, the coordinating UE 111 directs a group of at least two UEs to perform peer-to-peer federated learning as described with reference to FIG. 14.

In other aspects, the coordinating UE 111 determines a new UECS federated learning configuration without communicating the new baseline UECS federated learning configuration to the UECS. To illustrate, assume the coordinating UE 111 determines (at 910) new subsets of UEs to group together for UECS federated learning, such as by regrouping a first UE from a first subset of UEs to a second subset of UEs based on common signal and/or link quality parameters. In aspects, the coordinating UE 111 receives the updated ML configuration information and performs federated learning for the new subsets of UEs without notifying the UEs.

In aspects, the diagram 900 proceeds to the sub-diagram 675 of FIG. 6, where the UE 112 and/or the UE 113 detect one or more trigger conditions and generate updated ML configuration information as further described. Alternatively, or additionally, the diagram 900 proceeds to the signaling and control transactions at 705 of FIG. 7, where the coordinating UE 111 determines a common UECS ML configuration and/or baseline ML configuration for UEs based on the new UECS federated learning configuration determined at 910 (e.g., new subsets of UEs).

Figure 10:
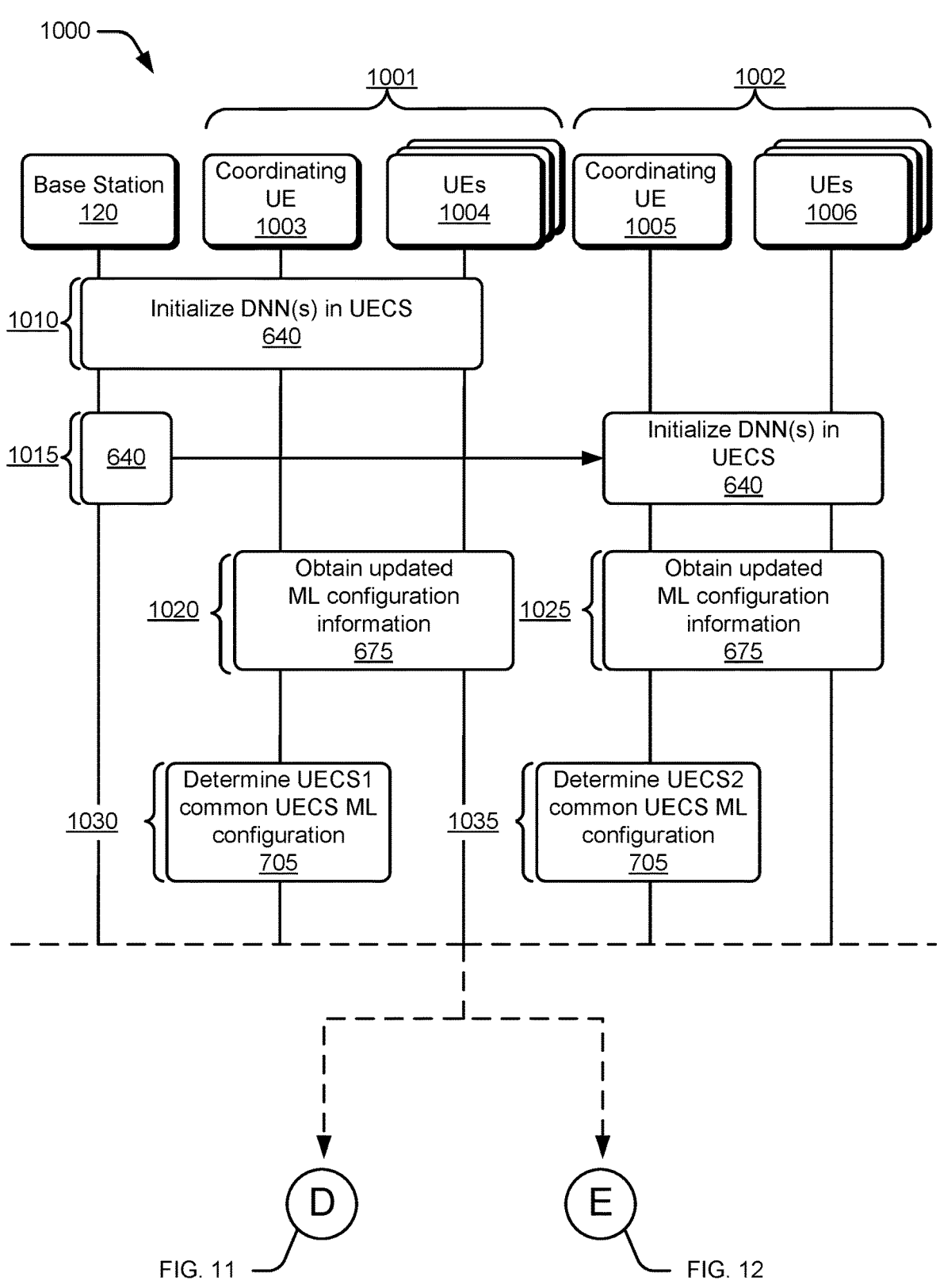
FIG. 10 illustrates an example transaction diagram between various network entities in accordance with various aspects of UECS federated learning for DNNs.

FIG. 10 illustrates a second signaling and control transaction diagram 1000 that is in accordance with various aspects of UECS federated learning for DNNs. The diagram 1000 of FIG. 10 leads to: (d) additional signaling and control transactions as illustrated by signaling and control transaction diagram 1100 of FIG. 11 or (e) additional signaling and control transactions as illustrated by signaling and control transaction diagram 1200 of FIG. 12.

The diagram 1000 includes signaling and control transactions between the base station 120 and at least two UECSs: UECS 1001 and UECS 1002. The UECS 1001 includes a coordinating UE 1003 and one or more UEs 1004. The UECS 1002 includes a coordinating UE 1005 and one or more UEs 1006. In aspects, the coordinating UE 1003 and the coordinating UE 1005 represent instances of the UE 111. Alternatively, or additionally, the UEs 1004 and/or the UEs 1006 represent instances of the UEs 112 and/or 113.

At 1010, the base station 120 performs a first instance of the sub-diagram 640 to initialize one or more UECS DNNs in the UECS 1001 and to configure devices in the UECS 1001 (by way of the coordinating UE 1003) for UECS federated learning. For example, the base station 120 determines baseline ML configurations, initializes UECS DNNs included in the UECS 1001, and configures how the coordinating UE 1003 and/or UEs perform UECS federated learning to determine ML configurations as further described. Similarly, at 1015, the base station 120 performs a second instance of the sub-diagram 640 to initialize one or more UECS DNNs in the UECS 1002 and to configure devices in the UECS 1002 (by way of the coordinating UE 1005) for UECS federated learning. In some aspects, the base station 120, the coordinating UE 1003, and/or the coordinating UE 1005 determine one or more subsets of UEs to group for UECS federated learning as further described.

As part of the sub-diagram 640 performed at 1010 and/or the sub-diagram 640 performed at 1015, the base station commands and/or directs the coordinating UE 1003 and the coordinating UE 1005 to communicate with one another to perform UECS federated learning, such as that described with reference to FIG. 11. To illustrate, the base station 120 directs each coordinating UE, as part of configuring the UECS federated learning at 625, to communicate and/or exchange the common UECS ML configurations (determined by each coordinating UE) with one another.

At 1020, the UEs within the UECS 1001 perform a first instance of the sub-diagram 675 to obtain updated UECS ML configuration information. To illustrate, one or more of the UEs detect an update condition and perform a training procedure (e.g., online or offline) to generate and send updated ML configuration information to the coordinating UE 1003. Similarly, at 1025, the UEs within the UECS 1002 perform a second instance of the sub-diagram 675 to obtain updated UECS ML configuration information.

At 1030, and as described at 705 of FIG. 7, the coordinating UE 1003 determines a UECS1 common UECS ML configuration using the updated ML configuration information obtained at 1020. To illustrate, the coordinating UE 1003 applies federated learning techniques that aggregate and/or combine the updated ML configuration information to generate the UECS1 common UECS ML configuration. At 1035, and as described at 705 of FIG. 7, the coordinating UE 1005 determines a UECS2 common UECS ML configuration by applying federated learning techniques as further described.

Figure 11:
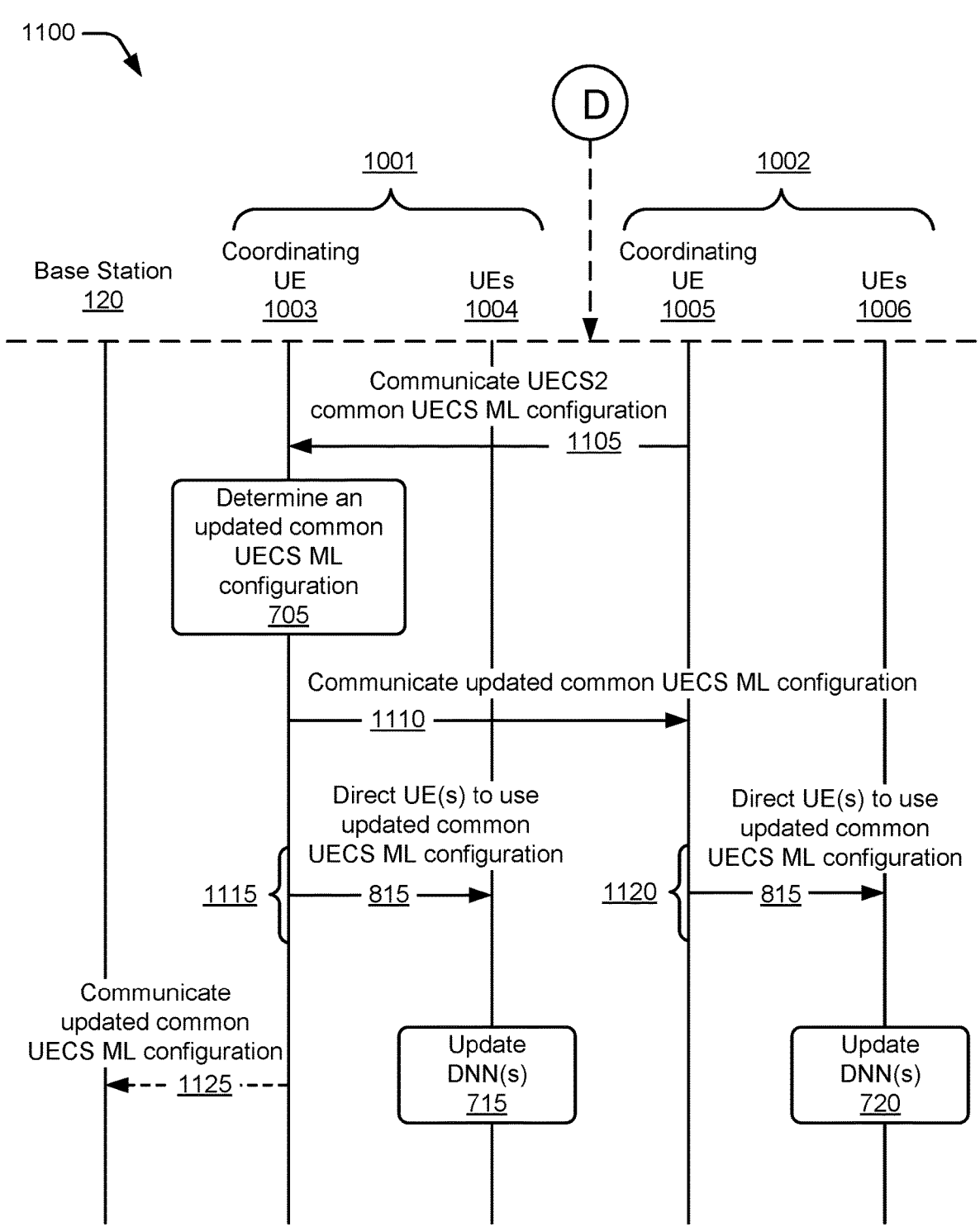
FIG. 11 continues from FIG. 10 and illustrates an example transaction diagram in which multiple coordinating UEs of multiple UECSs communicate to generate a common UECS ML configuration in accordance with various aspects of UECS federated learning for DNNs.
Figure 12:
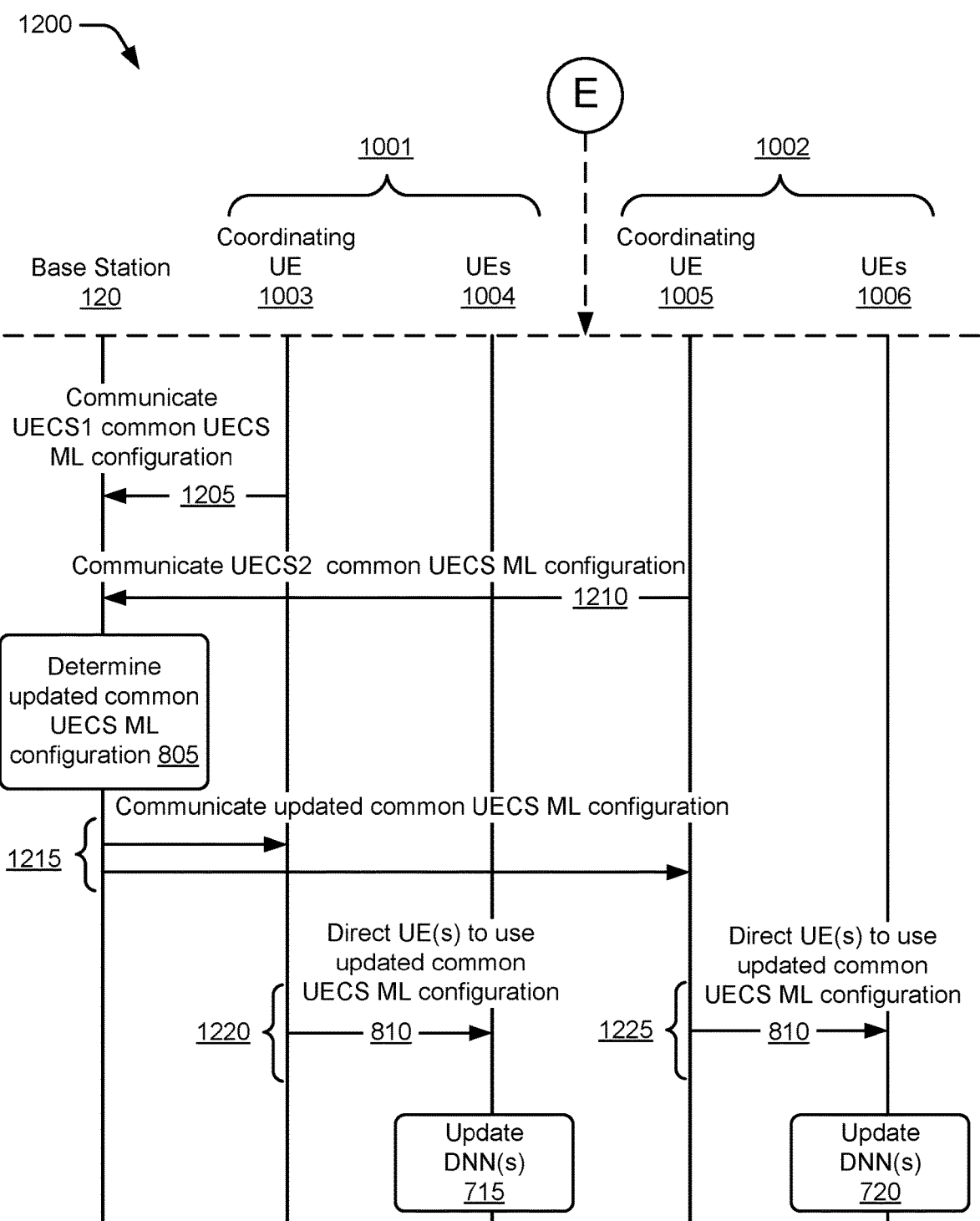
FIG. 12 continues from FIG. 10 and illustrates an example transaction diagram in which multiple coordinating UEs of multiple UECSs communicate with a base station to generate a common UECS ML configuration in accordance with various aspects of UECS federated learning for DNNs.

At this point, the diagram 1000 can proceed to at least two alternative paths: option "D" (described in FIG. 11) or option "E" (described in FIG. 12). FIG. 11 depicts a signaling and control transaction diagram 1100 in which a coordinating UE of a UECS determines (without additional involvement from the base station 120) an updated common UECS ML configuration shared between multiple UECSs. FIG. 12 depicts a signaling and control transaction diagram 1200 in which a base station aggregates and/or combines common UECS ML configurations generated by multiple UECSs to determine an updated common UECS ML configuration deployed to the multiple UECSs.

Continuing to option "D" in FIG. 11, at 1105, the coordinating UE 1005 of the second UECS (e.g., UECS 1002) communicates the UECS2 common UECS ML configuration to the coordinating UE 1003 of the first UECS (e.g., UECS 1001). As one example, the coordinating UE 1005 communicates the UECS2 common UECS ML configuration using a peer-to-peer side link (e.g., similar to the peer-to-peer side link between UE 112 and UE 113 as described with reference to FIG. 5).

The coordinating UE 1003 then determines an updated common UECS ML configuration using the UECS1 common UECS ML configuration and the UECS2 common UECS ML configuration as described at 705 of FIG. 7. For instance, as described with reference to FIG. 7, the coordinating UE 1003, by way of the federated learning manager 220, applies federated learning techniques to generate the updated common UECS ML configuration.

At 1110, the coordinating UE 1003 communicates the updated common UECS ML configuration to the coordinating UE 1005. For example, similar to that described at 1105, the coordinating UE 1003 communicates the updated common UECS ML configuration using a peer-to-peer side link between the two coordinating UEs.

At 1115, the coordinating UE 1003 performs signaling and control transactions as described at 815 of FIG. 8 to direct the UEs in the UECS 1001 to use the updated common UECS ML configuration. Similarly, at 1120, the coordinating UE 1005 performs signaling and control transactions as described at 815 of FIG. 8 to direct the UEs in the UECS 1002 to use the updated common UECS ML configuration.

At 1125, the coordinating UE 1003 optionally communicates the updated common UECS ML configuration to the base station 120. To illustrate, and similar to that described at 725 of FIG. 7, the coordinating UE 1003 communicates an index value to the base station 120 and/or communicates common characteristics of the selected UEs, subsets of UEs, and/or UECSs that contributed ML information used to determine the updated common UECS ML configuration(s) as further described.

The UEs of the UECS 1001 (e.g., UEs 1004) update the UECS DNN(s) using the updated common UECS ML configuration(s) as described at 715 of FIG. 7. Similarly, at 720, the UEs of the UECS 1002 (e.g., UEs 1006) update the UECS DNN(s) using the updated common UECS ML configuration(s). This can include performing small adjustments and/or forming new UECS DNNs with new architecture configurations as further described.

Returning to the diagram 1000 of FIG. 10, the diagram can proceed alternatively to option "E," which is described in FIG. 12 with signaling and control transaction diagram 1200. At 1205, the coordinating UE 1003 communicates the UECS1 common UECS ML configuration to the base station 120, and at 1210, the coordinating UE 1005 communicates the UECS2 common UECS ML configuration to the base station 120. This can include the UECS and the base station communicating using joint transmission and/or joint reception, which is not illustrated in diagram 1000 for visual brevity. In aspects, each coordinating UE transmits a respective index value to the base station 120, such as in an RRC message or a NAS message. Alternatively, or additionally, each coordinating UE communicates one or more common characteristics of the selected UEs and/or characteristics of the UECS that contributed ML information used to generate the respective common UECS ML configuration as further described.

As described at 805 of FIG. 8, the base station 120 determines an updated common UECS ML configuration based on at least the UECS1 common UECS ML configuration and the UECS2 common UECS ML configuration. For example, as further described, the base station 120 applies federated learning techniques to generate the updated common UECS ML configuration. For visual brevity, the diagram 1210 illustrates the base station 120 combining two common UECS ML configurations from two UECSs, but the base station can combine any number of common UECS ML configurations from any number of UECSs.

At 1215, based on determining the updated common UECS ML configuration, the base station communicates the updated common UECS ML configuration to each participating coordinating UE. To illustrate, and like that described at 1205 and at 1210, the base station 120 transmits an indication of an index value into a neural network table using an RRC message or a NAS message.

At 1220, the coordinating UE 1003 performs signaling and control transactions as described at 810 of FIG. 8 to direct each selected UE to use the updated common UECS ML configuration. Similarly, at 1225, the coordinating UE 1005 performs signaling and control transactions as described at 810 of FIG. 8 to direct each selected UE to use the updated common UECS ML configuration(s). The UEs 1004 then update one or more UECS DNNs using the updated common UECS ML configuration(s) at 715, and the UEs 1006 update one or more UECS DNNs using the updated common UECS ML configuration(s) at 720.

Figure 13:
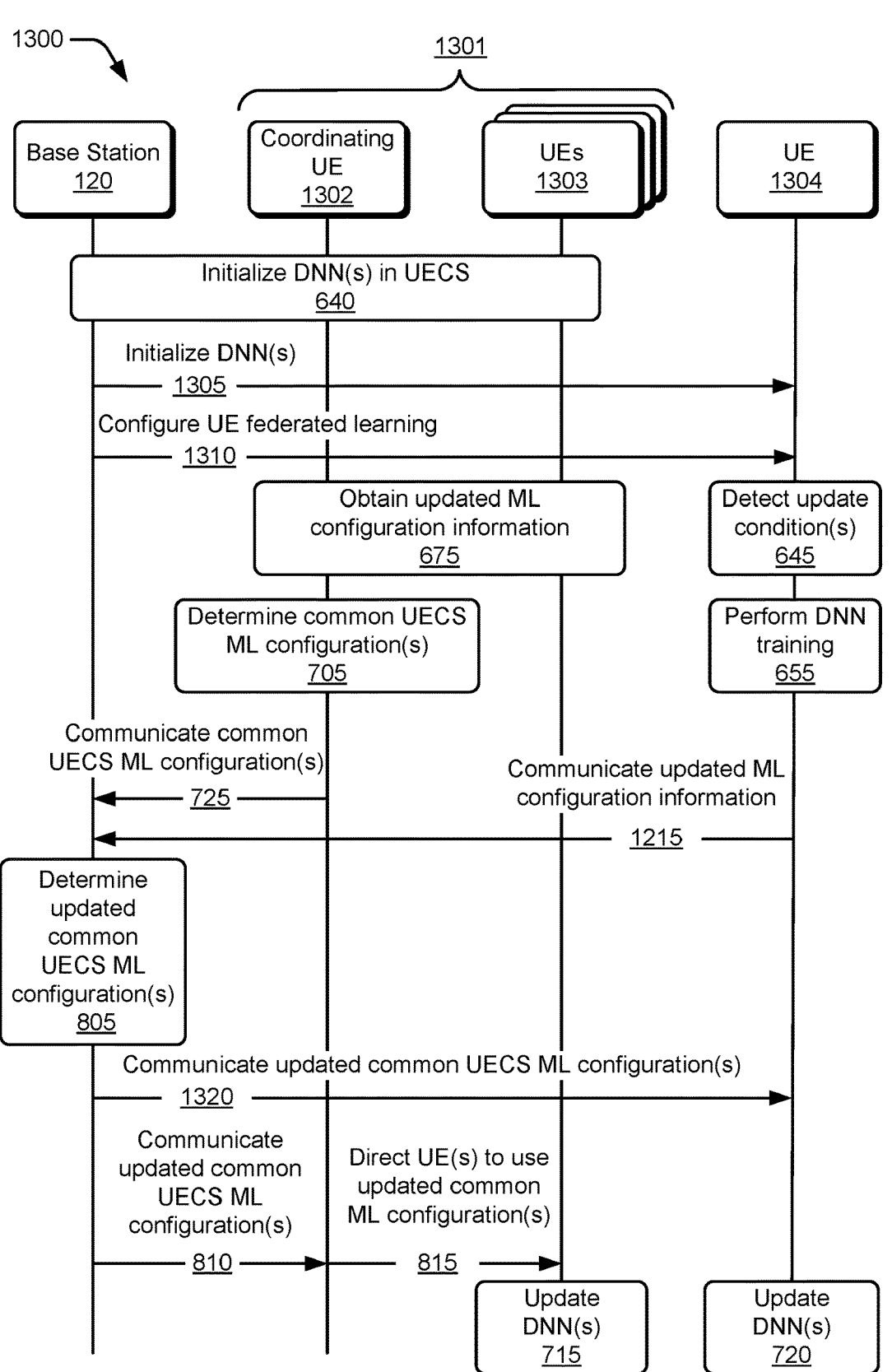
FIG. 13 illustrates an example transaction diagram between various network entities in accordance with various aspects of UECS federated learning for DNNs.

FIG. 13 illustrates a third signaling and control transaction diagram 1300 that is in accordance with various aspects of UECS federated learning for DNNs. The diagram 1300 includes signaling and control transactions between the base station 120, a UECS 1301 that includes a coordinating UE 1302 and one or more UEs 1303, and a non-UECS UE 1304 (e.g., not included in the UECS). In aspects, the coordinating UE represents an instance of the UE 111, and the UEs 1303 represent one or more instances of the UE 112 and/or UE 113. The UE 1304 generally represents an instance of the UE 110, but where the UE 110 acts as a non-participant in a UECS.

As described at 640 of FIG. 6, the base station 120, the coordinating UE 1302, and the UE(s) 1303 initialize one or more UECS DNN(s) in the UECS 1301 as described with reference to FIG. 6. For example, the base station 120 determines baseline ML configurations (e.g., as described at 610 of FIG. 6), initializes UECS DNNs included in the UECS 1301 (e.g., as described at 620 of FIG. 6), and configures how the coordinating UE 1003 and/or UEs perform UECS federated learning to determine ML configurations (e.g., as described at 625 of FIG. 6).

At 1305, the base station 120 directs the UE 1304 to initialize one or more DNN(s). To illustrate, the base station 120 directs the UE 1304 to initialize a first DNN (e.g., DNN 308) that processes downlink communications from the base station 120 and a second DNN (e.g., DNN 312) that processes uplink communications to the base station 120. In aspects, the base station 120 indicates a same baseline ML configuration to the UE 1304 and at least some of the UEs 1303 such that the UEs form similar DNNs.

At 1310, the base station 120 configures the UE 1304 for UE federated learning. To illustrate, and similar to that described at 625 of FIG. 6 (and included in the signaling and control transactions at 640), the base station 120 communicates one or more update conditions to the UE 1304 that specify when to perform a training procedure and/or when to report updated UECS ML configuration information. In aspects, because the base station 120 indicates a common baseline ML configuration to the UE 1304 and the selected UEs in the UECS 1301, the base station can apply federated techniques to: (a) the updated ML configuration information generated by the UE 1304 and (b) a common UECS ML configuration generated by the coordinating UE of the UECS 1001 to determine an updated common UECS ML configuration.

As described at 675 of FIG. 6, and as described with reference to FIG. 6, the coordinating UE 1302 and at least some UEs 1303 obtain updated UECS ML configuration information. At 705, as described with reference to FIG. 7, the coordinating UE 1302 determines a common UECS ML configuration based on the updated ML configuration information generated by the UEs.

Similarly, as described at 645 of FIG. 6, the UE 1304 detects one or more update conditions. Based on detecting the update condition(s), at 655, the UE 1304 performs DNN training, which can include online or offline training using local data as further described.

As described at 725 of FIG. 7, the coordinating UE 1302 communicates the common UECS ML configuration to the base station 120. Alternatively, or additionally, the coordinating UE 1302 communicates common UE characteristics for the UEs that contributed updated ML configuration information (e.g., at least a subset of UEs in the UECS 1301). At 1315, the UE 1304 communicates the updated ML configuration information to the base station 120. To illustrate, the UE 1304 transmits an indication of an index value into a neural network table in an RRC message or a NAS message. Alternatively, or additionally, the UE 1304 communicates any combination of UE characteristics (e.g., UE capabilities, signal/link quality parameters, UE location, UE hardware configuration).

As described at 805 of FIG. 8, the base station 120 determines an updated common UECS ML configuration based on the common UECS ML configuration determined by the coordinating UE 1302 and the updated ML configuration information generated by the UE 1304. To illustrate, the base station 120 uses federated learning techniques to aggregate and/or combine the common UECS ML configuration and the updated UECS ML configuration information.

At 1320, the base station 120 communicates the updated common UECS ML configuration(s) to the UE 1304. Alternatively, or additionally, the base station 120 directs the UE 1304 to update one or more DNNs based on the updated common UECS ML configuration(s). In aspects, the base station 120 implicitly directs the UE 1304 to update the DNN(s) by sending an indication of the updated common UECS ML configurations, while in other aspects, the base station 120 explicitly directs the UE 1304 to update the DNN(s), such as through a flag in an RRC message and/or a NAS message.

As described at 810 of FIG. 8, the base station 120 also communicates the updated common UECS ML configuration(s) to the coordinating UE 1302. In communicating the updated common UECS ML configuration(s) to the coordinating UE, the base station 120 directs the coordinating UE 1302 to deliver the updated common UECS ML configuration(s) to the selected UEs (e.g., a subset or all) within the UECS 1301. As further described, this can include the base station 120 communicating the updated common UECS ML configuration(s) to the coordinating UE 1302 using joint communications, which is not illustrated for simplicity's sake. At 815, the coordinating UE 1302 directs the selected UEs to use the updated common UECS ML configuration by communicating the updated common UECS ML configuration through a side link.

The selected UEs 1303 then update one or more UECS DNNs using the updated common UECS ML configuration(s) as described at 715 of FIG. 7. Similarly, at 720, the UE 1304 updates one or more DNN using the updated common UECS ML configuration(s) as further described.

Figure 14:
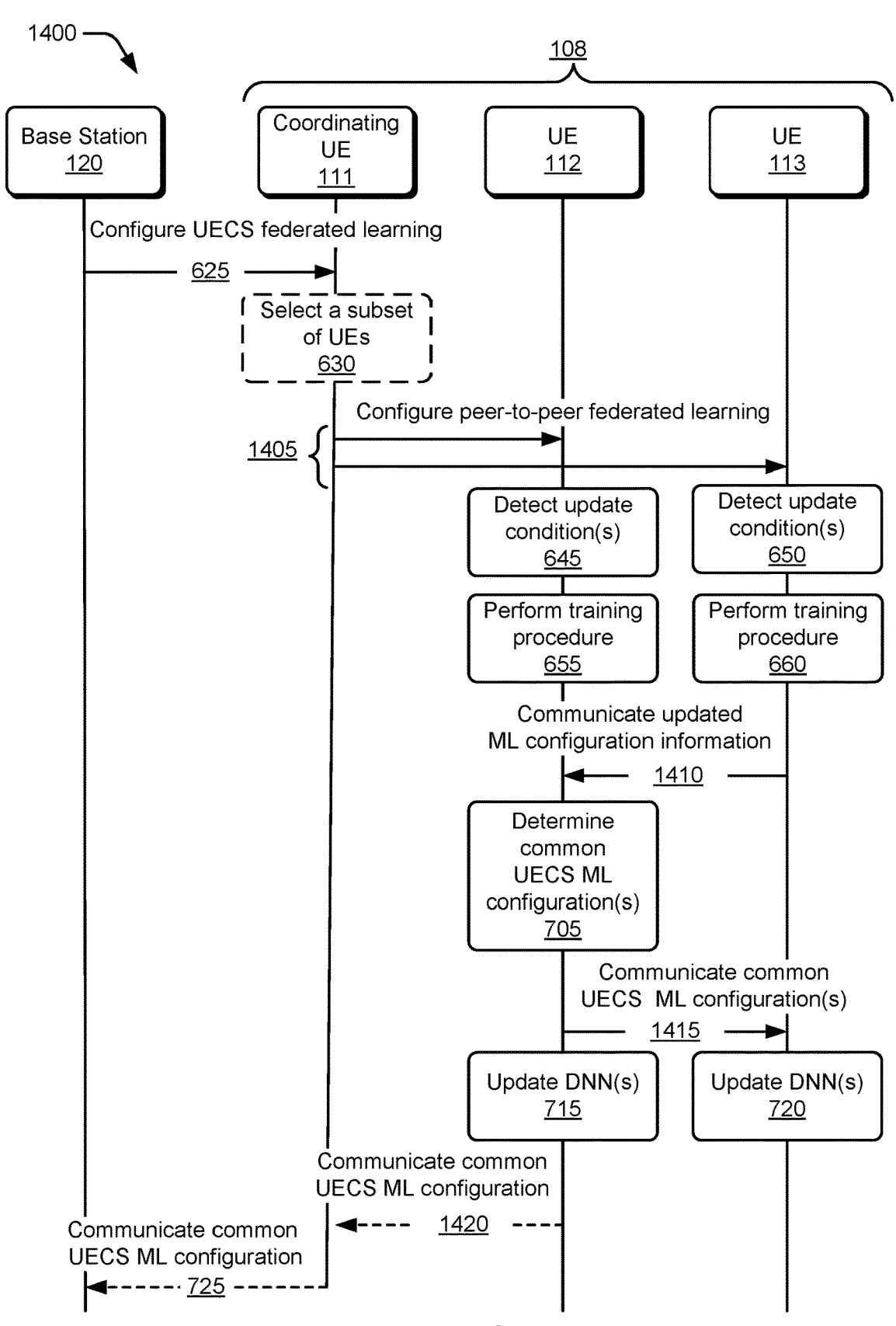
FIG. 14 illustrates an example transaction diagram between various network entities in accordance with various aspects of UECS federated learning for DNNs.

A fourth example of signaling and control transactions for UECS federated learning for DNNs is illustrated by the signaling and control transaction diagram 1400 of FIG. 14. The diagram 1400 includes signaling and control transactions between the base station 120, the coordinating UE 111, the UE 112, and the UE 113 of FIG. 1, where the coordinating UE 111, the UE 112, and the UE 113 are included in the UECS 108.

The diagram 1400 begins at 625 of FIG. 6, where the base station 120 configures the coordinating UE 111 for UECS federated learning. In aspects, the diagram 1400 represents a continuation of FIG. 6 at 625. In other words, the diagram 1400 can include some or all of the signaling and control transactions at 605, 610, and/or 615 as described with reference to FIG. 6 but are not illustrated in FIG. 14 for visual brevity. In configuring the coordinating UE 111, the base station 120 directs the coordinating UE 111 to configure two or more UEs to perform peer-to-peer federated learning.

At 630, the coordinating UE 111 optionally selects a subset of UEs within the UECS 108 to perform peer-to-peer federated learning. Alternatively, or additionally, the base station 120 indicates the subset of UEs to the coordinating UE 111 at 625. As further described, the coordinating UE 111 (or the base station 120) sometimes selects the subset of UEs based on common UE characteristics. Other times, the coordinating UE 111 selects all of the UEs within the UECS 108 to perform the peer-to-peer federated learning.

At 1405, the coordinating UE 111 configures the selected UEs (e.g., UE 112, UE 113) to perform peer-to-peer federated learning. For example, the coordinating UE 111 communicates with each of the selected UEs over a respective side link (e.g., wireless link 134, wireless link 135) and directs the selected UEs to perform the peer-to-peer federated learning. This can include the coordinating UE 111 indicating the selection of UEs included in the peer-to-peer federated learning. Alternatively, or additionally, the coordinating UE 111 communicates one or more update conditions that specify when to generate updated ML configuration information and perform the peer-to-peer federated learning. In some aspects, the coordinating UE 111 indicates, to each of the selected UEs, the UE designated to perform the federated learning (e.g., by way of the UE federated learning manager 220). In other words, the coordinating UE 111 directs the selected UEs to forward updated ML configuration information to a particular UE.

At 645, the UE 112 detects one or more of the update conditions, and at 650, the UE 113 detects one or more of the update conditions. As further described with reference to FIG. 6, the UE 112 then performs a training procedure at 655, and the UE 112 performs a training procedure at 660.

At 1410, the UE 113 communicates updated ML configuration information to the UE 112. To illustrate, the UE 113 transmits an index value into a neural network table to the UE 112 using a peer-to-peer side link (e.g., wireless link 133).

At 705, as described with reference to FIG. 7, the UE 112 determines, by way of the UE federated learning manager 220, one or more common UECS ML configuration(s). For example, the UE 112 performs federated learning techniques that aggregate and/or combine updated ML configuration information from the UE 113 with updated ML configuration information generated by the UE 112 to generate the common UECS ML configuration(s).

At 1415, the UE 112 communicates the common UECS ML configuration(s) to the UE 113. To illustrate, and similar to that described at 1410, the UE 112 indicates an index value into a neural network table using the side link.

At 715, the UE 112 updates one or more DNN(s) using the common UECS ML configuration(s) determined at 705. Similarly, at 720, the UE 113 updates one or more DNN(s) using the common UECS ML configuration(s) indicated at 1415.

In some aspects, the UE 112 optionally communicates the common UECS ML configuration to the coordinating UE 111 at 1420. This can include communicating common characteristics, such as commensurate signal or link quality parameters, UE locations, and/or an indication of the detected update condition. Similarly, at 725, the coordinating UE 111 optionally communicates the common UECS ML configuration (and/or common characteristics) to the base station 120 as further described.

Using DNNs for processing UECS communications allows a network entity, such as the coordinating UE, base station, or a UE, to dynamically determine and/or adjust the DNN configurations based on changes in an operating environment (e.g., signal quality changes, link quality changes, ML parameter changes, ML architecture changes, UE location changes). Federated learning allows each of these devices to collect additional ML information and train the ML configurations used to update the DNNs and subsequently improve the performance of how the DNNs process UECS communications (e.g., higher resolution, faster processing, lower bit errors, improved signal quality, improved latency). Federated learning provides the devices generating the DNN updates with additional information while protecting the local data used to generate the DNN updates. Various aspects of UECS federated learning for DNNs also help reduce traffic between the base station and the UEs and improve network availability and reliability by allowing the base station to service other devices.

Example Methods

Example methods 1500, 1600, 1700, and 1800 are described with reference to FIGS. 15, 16, 17, and 18 in accordance with one or more aspects of UECS federated learning for DNNs.

FIG. 15 illustrates an example method 1500 used to perform aspects of UECS federated learning for DNNs. In some implementations, operations of the method 1500 are performed by a coordinating UE for a UECS, such as the UE 111, the UE 111, the UE 1003, the UE 1005, and/or the UE 1302.

At 1505, a coordinating UE communicates one or more update conditions to at least a subset of UEs in a UECS. To illustrate, the coordinating UE 111 transmits the one or more update conditions using one or more side links (e.g., wireless link 134, wireless link 135) as described at 635 of FIG. 6. In aspects, the update conditions indicate when to generate updated ML configuration information (e.g., updated ML parameters, updated ML architectures) for at least one respective deep neural network (DNN) that processes UECS communications. In some aspects, the coordinating UE 111 selects the subset of UEs from the UECS, such as that described at 630 of FIG. 6. Alternatively, or additionally, a base station (e.g., base station 120) indicates the subset of UEs to the coordinating UE as described at 615 of FIG. 6. At times, the coordinating UE 111 communicates to, as the at least subset of UEs in the UECS, a sub-group of UEs within the UECS that excludes at least one UE in the UECS. Other times, the coordinating UE 111 communicates to, as the at least subset of UEs in the UECS, all of the UEs in the UECS.

At 1510, the coordinating UE receives one or more reports, where each respective report includes the updated ML configuration information determined by a respective UE in at least the subset by using a training procedure and input data local to the respective UE. For example, the coordinating UE 111 receives the report(s) from the UE 112 and/or the UE 113 as described at 665 and/or at 670 of FIG. 6. In aspects, the UE 112 and/or the UE 113 transmit the updated ML configuration information using a side link, such as a local wireless connection or air interface resources allocated by a base station for side link and/or intra-UECS communications. The respective reports can indicate any type of updated UECS ML configuration information, such as an index value that maps to an entry in a neural network table, a (delta) update to an initial and/or baseline UECS ML configuration used by one or more UEs, or UECS ML configuration that indicates an (absolute) ML configuration that forms new DNN.

At 1515, the coordinating UE determines a common UECS ML configuration by applying federated learning techniques to the updated UECS ML configuration information received in the one or more reports. For example, the UE 111, by way of the UE federated learning manager 220, combines updated ML configuration information from at least two UEs as described at 705 of FIG. 7.

At 1520, the coordinating UE directs at least one UE in at least the subset of UEs to update the at least one respective DNN using the at least one common UECS ML configuration. To illustrate, as described at 710 of FIG. 7, the UE 111 transmits one or more index value(s) that map to one or more entries in a neural network table that correspond to the common UECS ML configuration(s).

In some aspects, the method 1500 iteratively repeats as indicated at 1525, such as when a UE in the subset detects another update condition, generates additional updated UECS ML configuration information, and indicates the additional updated ML configuration information to the coordinating UE. This allows the coordinating UE to apply federated learning to dynamically adapt UECS DNNs, and improve how the UECS DNNs process UECS communications, to optimize (and re-optimize) the processing as UECS communications and/or UE characteristics change (e.g., changing UEs that participate, changing UE locations, changing received signal/link quality parameters).

FIG. 16 illustrates an example method 1600 used to perform aspects of UECS federated learning for DNNs. In some implementations, operations of the method 1600 are performed by a coordinating user equipment of a UECS, such as the UE 111, the UE 1003, the UE 1005, and/or the UE 1302.

At 1605, a coordinating UE identifies a subset of UEs in a UECS to perform peer-to-peer federated learning for one or more UECS DNNs using a training procedure and data local to each UE in the subset of UEs. As one example, the coordinating UE 111 identifies the subset of UEs based on one or more characteristics common to each UE in the subset of UEs (e.g., UE 112, UE 113) as described at 630 of FIG. 6. Alternatively, or additionally, the coordinating UE 111 receives an indication of the subset from a base station (e.g., base station 120) as described at 625 of FIG. 6.

At 1610, the coordinating UE directs each UE in the subset of UEs to perform the peer-to-peer federated learning by using updated ML configuration information generated by a training procedure and data local to each UE in the subset of UEs. To illustrate, the coordinating UE 111 communicates with each UE (e.g., UE 112 and UE 113) using a side link and configures the peer-to-peer federated learning as described at 1405 of FIG. 14. In aspects, the coordinating UE 111 directs a first UE (e.g., UE 113) to communicate the updated ML configuration information to a particular UE in the UECS (e.g., UE 112). Alternatively, or additionally, the coordinating UE 111 directs the particular UE (e.g., UE 112) to apply federated learning techniques that aggregate and/or combine the updated ML configuration information received from other UEs in the UECS.

At 1615, the coordinating UE communicates, to each UE in the subset, one or more update conditions that indicate when to perform the peer-to-peer federated learning. For example, as described at 1405, the coordinating UE 111 communicates one or more update conditions to each UE (e.g., UE 112 and UE 113) using the side link.

In some aspects, the method 1600 iteratively repeats as indicated at 1620. For instance, a base station may communicate a change of participating UEs in the UECS and/or the base station indicates a new subset of UEs. This iterative process allows the coordinating UE to adjust the peer-to-peer federated learning as conditions change.

FIG. 17 illustrates an example method 1700 used to perform aspects of UECS federated learning for DNNs. In some implementations, operations of the method 1700 are performed by a UE in a UECS, such as the UE 112, UE 113, UE 112, UE 112, one of the UEs 1004, one of the UEs 1006, and/or one of the UEs 1303.

At 1705, a UE receives one or more update conditions that indicate when to generate updated UECS ML configuration information, using a training procedure and local data, for at least one DNN that processes UECS wireless communications. To illustrate, as described at 635 of FIG. 6, the UE 112 (and the UE 113) receive the one or more update conditions from the coordinating UE 111 over a side link (e.g., wireless link 134, wireless link 135).

At 1710, the UE detects an occurrence of one or more update conditions. For example, as described at 645 of FIG. 6, the UE 112 detects the occurrence of the update condition(s). Similarly, as described at 650 of FIG. 6, the UE 113 detects the occurrence of the update condition(s).

At 1715, the UE generates the updated ML configuration information by performing the training procedure on the at least one DNN using the local data. To illustrate, after detecting the occurrence of the one or more update conditions, and as described at 655 of FIG. 6, the UE 112 performs a training procedure on one or more UECS DNNs, such as any combination of UECS DNNs as described with reference to FIG. 5.

At 1720, the UE transmits, to the coordinating UE and using the side link, a report that includes the updated UECS ML configuration information. To illustrate, as described at 665 of FIG. 6, the UE 112 transmits one or more index value(s) that map to one or more entries in a neural network table to the coordinating UE 111, where the UE uses a side link (e.g., wireless link 134). Similarly, as described at 670 of FIG. 6, the UE 113 transmits one or more index value(s) to the coordinating UE 111 using a second side link (e.g., wireless link 135).

At 1725, the UE receives a common UECS ML configuration that may differ from the updated UECS ML configuration information. For instance, the UE 112 receives, from the coordinating UE 111, a common UECS ML configuration determined by the coordinating UE based on at least a second UE and as described at 710 of FIG. 7. As another example, the UE 113 receives the common UECS ML configuration as described at 710 of FIG. 7.

At 1730, the UE updates the at least one DNN using the common UECS ML configuration. To illustrate, the UE 112 updates one or more DNNs as described at 715 of FIG. 7, such as any combination of UECS DNNs as described with reference to FIG. 5.

In some aspects, the method 1700 iteratively repeats as indicated at 1735, such as when the UE detects another update condition, generates additional updated UECS ML configuration information, and indicates the additional updated ML configuration information to the coordinating UE. This allows the UE to dynamically adapt UECS DNNs by reporting updated ML configuration information as conditions change and improve how the UECS DNNs process UECS communications.

FIG. 18 illustrates an example method 1800 used to perform aspects of UECS federated learning for DNNs. In some implementations, operations of the method 1800 are performed by a base station, such as the base station 120 of FIG. 1.

At 1805, a base station receives one or more characteristics and/or parameters about a set of UEs in a UECS. As one example, as described at 605 of FIG. 6, the base station 120 receives any combination of signal and/or link quality parameters, UE capabilities, UE locations, hardware configurations, and so forth, from any combination of the UE 111, the UE 112 and/or the UE 113. In some aspects, the base station 120 identifies the set of UEs by one or more characteristics and/or parameters that are common between each UE of the set of UEs. This can include the base station identifying a subset of UEs within the UECS or all of the UEs within the UECS.

At 1810, the base station determines at least one baseline ML configuration for one or more UECS DNNs used by the set of UEs. For example, as described at 610 of FIG. 6, the base station 120 determines a baseline ML configuration for one or more UECS DNNs, such as the UECS DNNs described with reference to FIG. 5. In aspects, the base station 120 determines the baseline configuration(s) using the one or more characteristics (and/or parameters) common between the set of UEs and accessing a neural network table as further described.

At 1815, the base station configures UECS federated learning for the UECS by communicating at least the baseline ML configuration to a coordinating UE of the UECS. To illustrate, as described at 625 of FIG. 6, the base station 120 communicates one or more baseline configurations to the coordinating UE 111.

In some aspects, the method 1800 iteratively repeats as indicated at 1820, such as when the base station receives updated parameters and/or characteristics or when the base station determines to change participating UEs within the UECS. This allows the base station to reduce traffic by configuring the UECS to perform federated learning without additional messaging with the base station and improve how the UECS DNNs process UECS communications.

The order in which the method blocks of the method 1500, 1600, 1700, and 1800 are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although techniques and devices for UECS federated learning for DNNs have been described in language specific to features and/or methods, it is to be understood that the subject of the appended claims is not necessarily limited to the specific features or methods described. Rather, the specific features and methods are disclosed as example implementations of UECS federated learning for DNNs.

EXAMPLES

Example 1: A method performed by a coordinating user equipment (UE) in a user equipment-coordination set (UECS) for determining a common UECS machine-learning (ML) configuration using federated learning, the method comprising: communicating, to at least a subset of user equipments (UEs) in the UECS and using one or more side links, one or more update conditions that indicate, to at least each UE of the subset, when to generate updated ML configuration information for a respective deep neural network (DNN) that processes communications at the respective UE; receiving, over the one or more side links, one or more reports, each respective report including the updated ML configuration information determined by a respective UE of the subset of UEs using a training procedure and input data local to the respective UE; determining the common UECS ML configuration by applying federated learning techniques to the updated ML configuration information received in the one or more reports; and directing at least one UE of the subset of UEs to update the respective DNN using the common UECS ML configuration.

Example 2: The method as recited in example 1, further comprising: selecting the subset of UEs in the UECS based on one or more UE characteristics that are common to each UE in the subset of UEs.

Example 3: The method as recited in example 2, wherein selecting the subset of UEs further comprises: selecting at least two UEs, from the UECS, with one or more: common UE capabilities; commensurate signal or link quality parameters; or commensurate UE-locations.

Example 4: The method as recited in any one of examples 1 to 3, wherein the one or more update conditions comprise at least: a schedule; or a trigger event.

Example 5: The method as recited in example 4, wherein the one or more update conditions comprises the trigger event, and wherein the trigger event comprises: one or more ML parameters of the respective DNN changing by more than a first threshold value; an ML architecture of the respective DNN changing; a first signal or link quality parameter changing by more than a second threshold value; or a UE-location changing by at least a third threshold value.

Example 6: The method as recited in any one of examples 1 to 5, wherein receiving the one or more reports further comprises: receiving the updated ML configuration information for at least one of: a first DNN that processes incoming communications from a base station; a second DNN that processes outgoing communications to the base station; a third DNN that processes incoming side-link communications from the coordinating UE; a fourth DNN that processes outgoing side-link communications to the coordinating UE; a fifth DNN that processes incoming side-link communications from another UE in the UECS; a sixth DNN that processes outgoing side-link communications to the other UE in the UECS; or a seventh DNN that processes peer-to-peer side-link communications in the UECS.

Example 7: The method as recited in any one of examples 1 to 6, further comprising: communicating the common UECS ML configuration to a base station.

Example 8: The method as recited in any one of examples 1 to 6, wherein the common UECS ML configuration is a first common UECS ML configuration, the method further comprising: receiving, over a peer-to-peer side link and from a second coordinating UE of a second UECS, a second common UECS ML configuration; and determining an updated common UECS ML configuration by combining the second common UECS ML configuration with the first common UECS ML configuration, and wherein directing each UE to update the respective DNN using the common UECS ML configuration further comprises: directing at least one UE of the subset of UEs to use the updated common UECS ML configuration.

Example 9: The method as recited in example 8, further comprising: communicating, using the peer-to-peer side link, the updated common UECS ML configuration to the second coordinating UE.

Example 10: The method as recited in any one of examples 8 or 9, further comprising: communicating the updated common UECS ML configuration to a base station.

Example 11: The method as recited in example 10, further comprising: communicating, to the base station, one or more UE characteristics common to the subset of UEs.

Example 12: The method as recited in any one of examples 8 to 11, wherein combining the second common UECS ML configuration with the first common UECS ML configuration further comprises: determining the updated common UECS ML configuration from the second common UECS ML configuration and the first common UECS ML configuration by applying averaging to the second common UECS ML configuration and the first common UECS ML configuration; applying a weighted mean function to the second common UECS ML configuration and the first common UECS ML configuration; applying a minimizing or maximizing function to the second common UECS ML configuration and the first common UECS ML configuration; or applying a least-squares function to the second common UECS ML configuration and the first common UECS ML configuration.

Example 13: The method as recited in any one of examples 1 to 12, further comprising: receiving, from a base station, an indication of air interface resources allocated to the UECS for intra-UECS communications; and assigning the air interface resources to one or more UEs in the UECS.

Example 14: The method as recited in any one of examples 1 to 13, wherein determining the common UECS ML configuration further comprises: determining at least one of: an ML architecture; or one or more ML parameters.

Example 15: The method as recited in any one of examples 1 to 14, wherein communicating the one or more update conditions to the at least a subset of UEs further comprises: communicating to a sub-group of UEs within the UECS; or communicating to all UEs in the UECS.

Example 16: The method as recited in any one of examples 1 to 15, wherein receiving the one or more reports including the updated ML configuration information further comprises: receiving, from each a respective UE, current UE characteristics.

Example 17: The method as recited in example 16, further comprising: analyzing the current UE characteristics; determining to reset UECS federated learning for the subset of UEs; and determining a new UECS federated learning configuration.

Example 18: The method as recited in any one of examples 1 to 17, wherein determining the common UECS ML configuration further comprises: applying averaging to the updated ML configuration information received; applying a weighted mean function to the updated ML configuration information; applying a minimizing or maximizing function to the updated ML configuration information; or applying a least-squares function to the updated ML configuration information.

Example 19: A method performed by a user equipment configured as a coordinating user equipment (UE) in a user equipment-coordination set (UECS) for determining at least one common UECS machine-learning (ML) configuration using federated learning, the method comprising: identifying a subset of user equipments (UEs) in the UECS to perform peer-to-peer federated learning for one or more DNNs using a training procedure and data local to each UE in the subset of UEs; directing each UE in the subset of UEs to perform the peer-to-peer federated learning using a training procedure and data local to each UE in the subset of UEs; and communicating, to each UE in the subset, one or more update conditions that indicate when to perform the peer-to-peer federated learning.

Example 20: The method as recited in example 19, further comprising: assigning air interface resources to each UE in the subset for performing the peer-to-peer federated learning; and communicating the assigned air interface resources to each UE in the subset.

Example 21: The method as recited in example 19 or example 20, wherein identifying the subset of UEs further comprises: selecting at least two UEs, from the UECS, with one or more: common UE capabilities; commensurate signal or link quality parameters; or commensurate UE-locations.

Example 22: The method as recited in example 19 or example 20, wherein identifying the subset of UEs further comprises: receiving, from a base station, a selection of UEs in the UECS to include in the subset of UEs.

Example 23: The method as recited in any one of examples 19 to 22, further comprising: receiving, from at least one UE in the subset of UEs, an indication of a common UECS ML configuration determined by the subset of UEs using the peer-to-peer federated learning.

Example 24: The method as recited in any one of examples 19 to 23, further comprising: directing each UE in the subset of UEs to communicate respective updated ML configuration information to a particular UE in the subset of UEs.

Example 25: A method performed by a user equipment (UE) in a user equipment-coordination set (UECS) for providing updated machine-learning (ML) configuration information used in federated learning, the method comprising: receiving, from a coordinating UE in the UECS and over a side link, one or more update conditions that indicate when to generate the updated ML configuration information, using a training procedure and local data, for at least one deep neural network (DNN) that processes UECS wireless communications; detecting an occurrence of the one or more update conditions; after detecting the occurrence of the one or more update conditions, generating the updated ML configuration information by performing the training procedure on the at least one DNN using the local data; transmitting, to the coordinating UE and using the side link, a report that includes the updated ML configuration information; receiving, from the coordinating UE and using the side link, a common UECS ML configuration based on at least a second UE in the UECS, the common UECS ML configuration differing from the updated ML configuration information; and updating the at least one DNN using the common UECS ML configuration.

Example 26: The method as recited in example 25, wherein the updated ML configuration information comprises at least one of: an ML architecture; or one or more ML parameters.

Example 27: The method as recited in example 25 or example 26, further comprising: receiving, from the coordinating UE, an allocation of air interface resources associated with transmissions over the side link.

Example 28: The method as recited in any one of examples 25 to 27, wherein the at least one DNN comprises at least: a first DNN that processes incoming communications from a base station; a second DNN that processes outgoing communications to the base station; a third DNN that processes incoming side-link communications from the coordinating UE; a fourth DNN that processes outgoing side-link communications to the coordinating UE; a fifth DNN that processes incoming side-link communications from the second UE in the UECS; or a sixth DNN that processes outgoing side-link communications to the second UE in the UECS.

Example 29: The method as recited in any one of examples 25 to 28, wherein receiving the one or more update conditions comprises: receiving one or more of: a schedule; or a trigger event.

Example 30: The method as recited in any one of examples 25 to 29, wherein the one or more update conditions comprise the trigger event, and wherein the trigger event comprises: one or more ML parameters of the at least one DNN changing by more than a first threshold value; an ML architecture of the at least one DNN changing; a first signal or link quality parameter changing by more than a second threshold value; or a UE-location changing by at least a third threshold value.

Example 31: The method as recited in any one of examples 25 to 30, wherein receiving the common UECS ML configuration further comprises: receiving an indication of at least one of: an ML parameter; or an ML architecture.

Example 32: The method as recited in any one of examples 25 to 31 wherein performing the training procedure further comprises: performing an offline training procedure or an online training procedure.

Example 33: A method performed by a base station for federated learning of one or more deep neural networks (DNNs) used in a user equipment-coordination set (UECS), the method comprising: receiving one or more characteristics about a subset of user equipments (UEs) in the UECS; determining at least one baseline machine-learning (ML) configuration for one or more DNNs used by the subset of UEs; and configuring UECS federated learning for the UECS by communicating at least the baseline ML configuration to a coordinating user equipment (UE) of the UECS.

Example 34: The method as recited in example 33, further comprising: allocating air interface resources for one or more side links between one or more UEs in the UECS to use for the UECS federated learning; and communicating the allocated air interface resources to the coordinating UE.

Example 35: The method as recited in example 33 or example 34, further comprising: receiving, from the coordinating UE, a first common UECS ML configuration generated by the coordinating UE; determining an updated common UECS ML configuration by combining the first common UECS ML configuration with a second common UECS ML configuration; and communicating the updated common UECS ML configuration to the coordinating UE.

Example 36: The method as recited in example 35, wherein the UECS comprises a first UECS, the coordinating UE comprises a first coordinating UE of the first UECS, and the method further comprises: receiving the second common UECS ML configuration from a second coordinating UE of a second UECS.

Example 37: The method as recited in example 36, further comprising: communicating the updated common UECS ML configuration to the second coordinating UE.

Example 38: The method as recited in example 36 or example 37, further comprising: determining to combine the first common UECS ML configuration with the second common UECS ML configuration based on one or more characteristics that are common between the first UECS and the second UECS.

Example 39: The method as recited in example 33, further comprising: receiving updated ML configuration information from a UE not included in the UECS; receiving, from the coordinating UE, a common UECS ML configuration generated by the coordinating UE; and generating an updated common UECS ML configuration using the updated ML configuration information and the common UECS ML configuration.

Example 40: The method as recited in example 39, wherein generating the updated common UECS ML configuration further comprises: determining to aggregate the common UECS ML configuration and the updated ML configuration information to generate the updated common UECS ML configuration based on determining that at least one characteristic of the UECS that is common with a characteristic of the UE not included in the UECS.

Example 41: The method as recited in any one of examples 33 to 40, further comprising: transmitting, to the coordinating UE, an indication of a subset of UEs within the UECS to use for the UECS federated learning.

Example 42: The method as recited in example 41, further comprising: selecting the subset of UEs within the UECS based on one or more characteristics common to each UE in the subset of UEs.

Example 43: The method as recited in example 41 or example 42, further comprising: directing the coordinating UE to configure the subset of UEs for peer-to-peer federated learning.

Example 44: A user equipment comprising: a processor; and computer-readable storage media comprising instructions, responsive to execution by the processor, for directing the user equipment to perform one of the methods of examples 1 to 32.

Example 45: A base station comprising: a processor; and computer-readable storage media comprising instructions, responsive to execution by the processor, for directing the base station to perform one of the methods of examples 33 to 43.

Example 46: A computer-readable storage media comprising instructions that, responsive to execution by a processor, cause a method as recited in any one of examples 1 to 43 to be performed.

What is claimed is:

1. A method performed by a coordinating user equipment, UE, in a user equipment-coordination set, UECS, of a wireless communication system, for determining a common UECS machine-learning, ML, configuration using federated learning, the UECS including at least two UEs configured to at least one of: jointly transmit uplink data generated by a target UE of the UECS, or jointly receive downlink data intended for the target UE, the method comprising:

communicating, to a second UE in the UECS and using one or more side links, one or more update conditions that indicate when to generate updated ML configuration information for one or more deep neural networks, DNNs, that are configured to perform some or all of a transmitter or a receiver processing functionality to process communications at the second UE;

receiving, from the second UE over the one or more side links, one or more reports, each report including the updated ML configuration information determined by the second UE using a training procedure and input data local to the second UE;

determining the common UECS ML configuration by applying federated learning techniques to the updated ML configuration information received in the one or more reports; and directing at least one UE of a subset of UEs to update at least one DNN using the common UECS ML configuration.

2. The method as recited in claim 1, wherein the one or more update conditions comprise at least:

a schedule; or a trigger event.

3. The method as recited in claim 2, wherein the one or more update conditions comprises the trigger event, and wherein the trigger event comprises:

one or more ML parameters of the at least one DNN changing by more than a first threshold value;

an ML architecture of the at least one DNN changing;

a first signal or link quality parameter changing by more than a second threshold value; or a UE-location changing by at least a third threshold value.

4. The method as recited in claim 1, wherein receiving the one or more reports further comprises:

receiving the updated ML configuration information for at least one of:

a first DNN that processes incoming communications from a base station;

a second DNN that processes outgoing communications to the base station;

a third DNN that processes incoming side-link communications from the coordinating UE;

a fourth DNN that processes outgoing side-link communications to the coordinating UE;

a fifth DNN that processes incoming side-link communications from another UE in the UECS;

a sixth DNN that processes outgoing side-link communications to the other UE in the UECS; or a seventh DNN that processes other side-link communications in the UECS.

5. The method as recited in claim 1, further comprising: communicating the common UECS ML configuration to a base station.

6. The method as recited in claim 1, wherein the common UECS ML configuration is a first common UECS ML configuration, the method further comprising:

receiving, over a side link and from a second coordinating UE of a second UECS, a second common UECS ML configuration; and determining an updated common UECS ML configuration by combining the second common UECS ML configuration with the first common UECS ML configuration, and wherein directing each UE to update the at least one DNN using the common UECS ML configuration further comprises:

directing at least one UE of the subset of UEs to use the updated common UECS ML configuration.

7. The method as recited in claim 1, wherein determining the common UECS ML configuration further comprises:

determining at least one of:

an ML architecture; or one or more ML parameters.

8. The method as recited in claim 1:

wherein receiving the one or more reports including the updated ML configuration information further comprises:

receiving, from the second UE, current UE characteristics; and further comprising:

analyzing the current UE characteristics;

determining to reset UECS federated learning for the subset of UEs; and determining a new UECS machine learning configuration.

9. A method performed by a user equipment configured as a coordinating user equipment, UE, in a user equipment-coordination set, UECS, of a wireless communication system, for determining at least one common UECS machine-learning, ML, configuration using federated learning, the UECS including at least two UEs configured to at least one of: jointly transmit uplink data generated by a target UE of the UECS, or jointly receive downlink data intended for the target UE, the method comprising:

identifying a subset of UEs, in the UECS to perform peer-to-peer federated learning for one or more DNNs using a training procedure and data local to each UE in the subset of UEs, wherein the one or more DNNs are each configured to perform some or all of a transmitter or a receive processing functionality to process communications at each UE;

directing each UE in the subset of UEs to perform the peer-to-peer federated learning using a training procedure and data local to each UE in the subset of UEs; and communicating, to each UE in the subset of UEs, one or more update conditions that indicate when to perform the peer-to-peer federated learning.

10. The method as recited in claim 9, further comprising:

assigning air interface resources to each UE in the subset of UEs for use in performing the peer-to-peer federated learning; and communicating the assigned air interface resources to each UE in the subset of UEs.

11. The method as recited in claim 9, wherein identifying the subset of UEs further comprises:

selecting at least two UEs, from the UECS, with one or more:

common UE capabilities;

commensurate signal or link quality parameters; or commensurate UE-locations.

12. The method as recited in claim 9, wherein identifying the subset of UEs further comprises:

receiving, from a base station, a selection of UEs in the UECS to include in the subset of UEs.

13. The method as recited in claim 9, further comprising:

receiving, from at least one UE in the subset of UEs, an indication of a common UECS ML configuration determined by the subset of UEs using the peer-to-peer federated learning.

14. The method as recited in claim 9, further comprising:

directing each UE in the subset of UEs to communicate an updated ML configuration information to a particular UE in the subset of UEs.

15. A user equipment, UE, comprising:

a processor; and computer-readable storage media comprising instructions, responsive to execution by the processor, for directing the user equipment to perform a method for determining a common UECS machine-learning, ML, configuration using federated learning, the UECS including at least two UEs configured to at least one of: jointly transmit uplink data generated by a target UE of the UECS, or jointly receive downlink data intended for the target UE, the method comprising:

communicating, from a coordinating UE to a second UE in the UECS and using one or more side links, one or more update conditions that indicate when to generate updated ML configuration information for one or more deep neural networks, DNNs, that are configured to perform some or all of a transmitter or a receiver processing functionality to process communications at the second UE;

receiving, from the second UE over the one or more side links, one or more reports, each report including the updated ML configuration information determined by the second UE using a training procedure and input data local to the second UE;

determining the common UECS ML configuration by applying federated learning techniques to the updated ML configuration information received in the one or more reports; and directing at least one UE of a subset of UEs to update at least one DNN using the common UECS ML configuration.

16. The user equipment as recited in claim 15, wherein the one or more update conditions comprise at least:

a schedule; or a trigger event.

17. The user equipment as recited in claim 16, wherein the one or more update conditions comprises the trigger event, and wherein the trigger event comprises:

one or more ML parameters of the at least one DNN changing by more than a first threshold value;

an ML architecture of the at least one DNN changing;

a first signal or link quality parameter changing by more than a second threshold value; or a UE-location changing by at least a third threshold value.

18. The user equipment as recited in claim 15, wherein receiving the one or more reports further comprises:

receiving the updated ML configuration information for at least one of:

a first DNN that processes incoming communications from a base station;

a second DNN that processes outgoing communications to the base station;

a third DNN that processes incoming side-link communications from the coordinating UE;

a fourth DNN that processes outgoing side-link communications to the coordinating UE;

a fifth DNN that processes incoming side-link communications from another UE in the UECS;

a sixth DNN that processes outgoing side-link communications to the other UE in the UECS; or a seventh DNN that processes other side-link communications in the UECS.

19. The user equipment as recited in claim 15, further comprising:

communicating the common UECS ML configuration to a base station.

20. The user equipment as recited in claim 15, wherein the common UECS ML configuration is a first common UECS ML configuration, the method further comprising:

receiving, over a side link and from a second coordinating UE of a second UECS, a second common UECS ML configuration; and determining an updated common UECS ML configuration by combining the second common UECS ML configuration with the first common UECS ML configuration, and wherein directing each UE to update the at least one DNN using the common UECS ML configuration further comprises:

directing at least one UE of the subset of UEs to use the updated common UECS ML configuration.

* * * * *